(12) United States Patent
Dong et al.

(10) Patent No.: US 10,879,968 B2
(45) Date of Patent: Dec. 29, 2020

(54) DATA PROCESSING METHOD, TRANSMISSION CONTROL DEVICE, AND RECEIVE END

(71) Applicant: HUAWEI TECHNOLOGIES CO., LTD., Guangdong (CN)

(72) Inventors: Pengpeng Dong, Shanghai (CN); Weiming Duan, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/264,317

(22) Filed: Jan. 31, 2019

(65) Prior Publication Data

US 2019/0165841 A1 May 30, 2019

Related U.S. Application Data

(63) Continuation of application No. PCT/CN2016/108246, filed on Dec. 1, 2016.

(30) Foreign Application Priority Data

Aug. 5, 2016 (WO) ................ PCT/CN2016/093597

(51) Int. Cl.
*H04B 7/02* (2018.01)
*H04B 7/0456* (2017.01)
(Continued)

(52) U.S. Cl.
CPC ............. *H04B 7/0456* (2013.01); *H04B 7/02* (2013.01); *H04B 7/024* (2013.01); *H04B 7/0417* (2013.01); *H04B 7/06* (2013.01)

(58) Field of Classification Search
CPC ........ H04B 7/0456; H04B 7/02; H04B 7/024; H04B 7/0417; H04B 7/06
(Continued)

(56) References Cited

U.S. PATENT DOCUMENTS

2010/0054353 A1* 3/2010 Roh ....................... H04L 1/0003
375/260
2012/0063346 A1* 3/2012 Khojastepour ...... H04B 7/0617
370/252
(Continued)

FOREIGN PATENT DOCUMENTS

CN 101136718 A 3/2008
CN 101141166 A 3/2008
(Continued)

OTHER PUBLICATIONS

Intel Corporation,"Further enhancements to CoMP and seamless mobility schemes",3GPP TSG RAN Meeting #70RP-151756,Sitges, Spain, Dec. 7-10, 2015,total 12 pages.
(Continued)

*Primary Examiner* — Zewdu A Kassa
(74) *Attorney, Agent, or Firm* — Womble Bond Dickinson (US) LLP

(57) ABSTRACT

Embodiments of the present application provide a data processing method. In the data processing method, before channel coding, a transmission control device divides a data flow into N sub-data flows, allocates the N sub-data flows to N transmit ends, and notifies the N transmit ends of a same time-frequency resource used for sending the allocated sub-data flows. By applying the technical solution, the N transmit ends can send different sub-data flows of a same data flow to a same receive end on the same time-frequency resource without a large amount of signaling interworking, and a system throughput can be improved without increasing network implementation complexity.

15 Claims, 15 Drawing Sheets

(51) Int. Cl.
*H04B 7/06* (2006.01)
*H04B 7/0417* (2017.01)
*H04B 7/024* (2017.01)

(58) Field of Classification Search
USPC ........................................ 375/267, 260, 259
See application file for complete search history.

(56) References Cited

U.S. PATENT DOCUMENTS

| | | |
|---|---|---|
| 2013/0294279 A1 | 11/2013 | Nagata |
| 2014/0146778 A1 | 5/2014 | Wang et al. |

FOREIGN PATENT DOCUMENTS

| | | |
|---|---|---|
| CN | 101374006 A | 2/2009 |
| CN | 101964696 A | 2/2011 |
| CN | 103299667 A | 9/2013 |
| CN | 103780528 A | 5/2014 |
| CN | 103959839 A | 7/2014 |
| WO | 2012093742 A1 | 7/2012 |
| WO | 2013023290 A1 | 2/2013 |

OTHER PUBLICATIONS

3GPP TR 36.819 V11.2.0 (Sep. 2013);3rd Generation Partnership Project;Technical Specification Group Radio Access Network;Coordinated multi-point operation for LTE physical layer aspects(Release 11),total 70 pages.

3GPP TR 25.872 V11.0.0 (Sep. 2011);3rd Generation Partnership Project;Technical Specification Group Radio Access Network;High Speed Packet Access (HSDPA) multipoint transmission (Release 11),total 29 pages.

Tokyo Institute of Technology: "Hybridfeedbackand precoding for MU-MIMOandJT-CoMP", 3GPP Draft; R1-101290, vol. RAN WG1, No. San Francisco, USA; Feb. 19, 2010, 6 pages.

* cited by examiner

DATA PROCESSING METHOD, TRANSMISSION CONTROL DEVICE, AND RECEIVE END

CROSS-REFERENCE TO RELATED APPLICATIONS

This application is a continuation of International Application No. PCT/CN2016/108246, filed on Dec. 1, 2016, which claims priority to International Application No. PCT/CN2016/093597, filed on Aug. 5, 2016. The disclosures of the aforementioned applications are herein incorporated by reference in their entireties.

TECHNICAL FIELD

Embodiments of the application relate to the field of wireless communications technologies, and in particular, to a data processing method, a receive end, and a transmission control device.

BACKGROUND

A multiple input multiple output (MIMO) wireless communications system includes at least one transmit end and at least one receive end. Each transmit end includes at least one transmit antenna, and each receive end includes at least one receive antenna. There may be a plurality of signal transmission paths between the at least one transmit antenna and the at least one receive antenna. The MIMO wireless communications system may implement, by using the plurality of paths, diversity or spatial multiplexing of data transmission.

To improve spectral efficiency, each transmit end performs, through joint collaboration and based on a relationship between a plurality of different spatial channels from the transmit end to the receive end, joint precoding and selection of MIMO layer mapping on a data flow sent by the transmit end. In this manner, a relationship between spatial channels of different transmit ends is used on a transmit end side, and therefore the spectral efficiency is improved. However, joint precoding collaboration between all transmit ends requires strict channel calibration between all the transmit ends, and a large amount of data exchange between the different transmit ends is caused because data of each MIMO layer needs to be obtained from the different transmit ends. In addition, to ensure joint precoding, signaling interworking with an extremely low delay is needed between the transmit ends. Therefore, in this manner, implementation complexity of the MIMO communications system is undoubtedly increased, and a total system throughput also needs to be improved.

SUMMARY

Embodiments of the present application disclose a data processing method, a transmission control device, and a receive end, to improve a total system throughput without increasing implementation complexity of a MIMO communications system.

A first aspect of the embodiments of the present application provides a data processing method, including:
determining, by a receive end, a combination of channel matrix $$\begin{pmatrix} H_1 & & & \\ & 0 & & \\ & & H_i & \\ & & & 0 \\ & & & & H_N \end{pmatrix}$$

of a downlink spatial channel from each of N transmit ends ($T_1, \ldots, T_i, \ldots,$ and $T_N$) to the receive end;
determining, by the receive end, a combination $$\begin{pmatrix} W_1 & & & \\ & 0 & & \\ & & W_i & \\ & & & 0 \\ & & & & W_N \end{pmatrix}$$

of an optimal precoding matrix of each transmit end from a precoding matrix codebook of each transmit end, where i is an integer greater than or equal to 1 and less than or equal to N, $W_i$ is an optimal precoding matrix of a transmit end $T_i$, and $$\begin{pmatrix} H_1 & & & \\ & 0 & & \\ & & H_i & \\ & & & 0 \\ & & & & H_N \end{pmatrix} \times \begin{pmatrix} W_1 & & & \\ & 0 & & \\ & & W_i & \\ & & & 0 \\ & & & & W_N \end{pmatrix}$$

satisfies an orthogonalization criterion; and
notifying, by the receive end, each transmit end of the optimal precoding matrix of each transmit end.

In this implementation, the receive end selects the optimal precoding matrix according to the orthogonalization criterion. This can implement orthogonalization between different downlink spatial channels, thereby improving a total system throughput without increasing implementation complexity of each transmit end.

Based on the first aspect, in a first possible implementation of the first aspect, the method further includes:
sending, by the receive end, first indication information to one of the N transmit ends, where the first indication information includes at least one of the following: a quantity of multiple input multiple output (MIMO) layers of a codeword that carries an allocated sub-data flow when the transmit end sends the allocated sub-data flow, and a reference modulation and coding scheme (MCS) of the codeword that carries the sub-data flow when the transmit end sends the allocated sub-data flow, where when the transmit end sends the allocated sub-data flow, data of the sub-data flow may be carried in one or more codewords, and a sum of the quantity of MIMO layers of the codeword of the transmit end and quantities of MIMO layers of codewords of other (N−1) transmit ends is not greater than a quantity of receive antennas of the receive end.

In this implementation, the receive end notifies the transmit end of the quantity of MIMO layers of the codeword for sending the allocated sub-data flow, and the quantity of MIMO layers is determined without a need of a large amount of signaling interworking between different transmit ends. This can simplify processing of each transmit end. The receive end notifies the transmit end of the reference MCS, and the reference MCS is used as a reference factor of an MCS actually used when the transmit end sends the allocated sub-data flow. This can increase accuracy of the MCS used during sending of the allocated sub-data flow.

Based on the first aspect or the first possible implementation of the first aspect, in a second possible implementation of the first aspect, the method further includes:

receiving, by the receive end, downlink control information of each transmit end, where the downlink control information includes at least one of the following: a serial number of the transmit end in the N transmit ends, a quantity of codewords and a modulation and coding scheme of each codeword when the transmit end sends an allocated sub-data flow, a quantity of MIMO layers and a correspondence between a MIMO layer and a codeword when the transmit end sends the allocated sub-data flow, a correspondence between a MIMO layer and a logical antenna port when the transmit end sends the allocated sub-data flow, and a precoding matrix indication when the transmit end sends the allocated sub-data flow; and processing, by the receive end, a downlink signal from each transmit end based on the downlink control information of each transmit end, to obtain a sub-data flow allocated to each transmit end, where the sub-data flow allocated to the transmit end is obtained after a transmission control device divides one data flow into N sub-data flows.

In this implementation, the receive end receives the allocated sub-data flow of each transmit end by receiving the downlink control information of each transmit end. The downlink control information includes information actually used when each transmit end sends the allocated sub-data flow. In this implementation, the modulation and coding scheme of each codeword in the downlink control information may be determined by referring to the reference modulation and coding scheme sent by the receive end in the first possible implementation of the first aspect, and the precoding matrix indication in the downlink control information may be determined by the transmit end by referring to a precoding matrix indication, sent by the receive end, of the optimal precoding matrix. The downlink control information received by the receive end is information used when the transmit end actually sends data. The receive end may receive, based on the received downlink control information, the downlink signal sent by the transmit end, and further obtain the sub-data flow carried in the downlink signal.

Based on the second possible implementation of the first aspect, in a third possible implementation of the first aspect, the downlink control information of each transmit end is carried in only a control channel from one of the N transmit ends to the receive end; or the downlink control information of each transmit end is carried in a control channel from the transmit end to the receive end.

In this implementation, the downlink control information of each transmit end is gathered on a control channel from one transmit end to the receive end and transmitted to the receive end (centralized transmission of the downlink control information). Alternatively, the downlink control information of each transmit end may be transmitted to the receive end separately (distributed transmission of the downlink control information).

Based on the second possible implementation or the third possible implementation of the first aspect, in a fourth possible implementation of the first aspect, the method further includes:

sending, by the receive end, second indication information to each transmit end, where the second indication information indicates whether the sub-data flow sent by each transmit end is correctly received.

In this implementation, the receive end feeds back whether the sub-data flow sent by each transmit end is correctly received. A transmit end sending a sub-data flow that is not correctly received may retransmit the sub-data flow.

A second aspect of the embodiments of the present application provides a data processing method, including:

before channel coding, dividing, by a transmission control device, one data flow into N sub-data flows, and averagely allocating the N sub-data flows to N transmit ends, where N is an integer greater than 1; and instructing, by the transmission control device, each of the N transmit ends to send an allocated sub-data flow to a same receive end on a same time-frequency resource.

In this implementation, before channel coding, the transmission control device allocates the data flow to different transmit ends in a unified manner, and notifies these transmit ends of the same time-frequency resource used for sending these sub-data flows. In this case, signaling interworking is not caused because coordination between the different transmit ends is not needed. Therefore, implementation complexity of a system can be reduced, and a capacity of the communications system is increased.

Based on the second aspect, in a first possible implementation of the second aspect, the method further includes:

notifying, by the transmission control device, each transmit end of a modulation and coding scheme (MCS) of a codeword, a quantity of multiple input multiple output (MIMO) layers of the codeword, and a logical antenna port corresponding to a MIMO layer that are configured when each transmit end sends the allocated sub-data flow, where a sum of quantities of MIMO layers when all transmit ends send allocated sub-data flows is not greater than a quantity of receive antennas of the receive end.

In this implementation, the modulation and coding scheme of the codeword, a quantity of layers of MIMO layer mapping, the logical antenna port corresponding to the MIMO layer, and the like that are configured for the data flow sent by each transmit end are notified by the transmission control device in a unified manner. The transmit end sends the sub-data flow based on a notification of the transmission control device.

Based on the second aspect or the first possible implementation of the second aspect, in a second possible implementation of the second aspect, in a time division multiplexing system, the method further includes:

determining, by the transmission control device, a channel matrix $$\begin{pmatrix} H_1 & & & \\ & O & & \\ & & H_i & \\ & & & O \\ & & & & H_N \end{pmatrix}$$

of a downlink spatial channel from each transmit end ($T_1, \ldots, T_i, \ldots,$ and $T_N$) to the receive end based on measurement performed by each transmit end on an uplink spatial channel;

determining, by the transmission control device, a combination $$\begin{pmatrix} W_1 & & & & \\ & O & & & \\ & & W_i & & \\ & & & O & \\ & & & & W_N \end{pmatrix}$$

of an optimal precoding matrix of each transmit end from a precoding matrix codebook of each transmit end, where i is an integer greater than or equal to 1 and less than or equal to N, $W_i$ is an optimal precoding matrix of a transmit end $T_i$, and $$\begin{pmatrix} H_1 & & & & \\ & O & & & \\ & & H_i & & \\ & & & O & \\ & & & & H_N \end{pmatrix} \times \begin{pmatrix} W_1 & & & & \\ & O & & & \\ & & W_i & & \\ & & & O & \\ & & & & W_N \end{pmatrix}$$

satisfies an orthogonalization criterion; and notifying, by the transmission control device, each transmit end of the optimal precoding matrix.

In this implementation, in the time division multiplexing system, the transmission control device determines the optimal precoding matrix of each downlink spatial channel according to the orthogonalization criterion based on measurement of each uplink spatial channel, and then notifies each transmit end of the optimal precoding matrix. Each transmit end may use the optimal precoding matrix notified by the transmission control device as a precoding matrix for precoding when each transmit end sends the sub-data flow.

Based on the second possible implementation of the second aspect, in a third possible implementation of the second aspect, the method further includes:

notifying, by the transmission control device, a serial number of each transmit end, where the serial number of each transmit end is obtained by the receive end from downlink control information received from each transmit end. In this implementation, the receive end can be clear about codewords corresponding to different MIMO layers and transmit ends corresponding to the codewords that are corresponding to the MIMO layers. The implementation may be used for centralized transmission or distributed transmission of the downlink control information.

A third aspect of the embodiments of the present application provides a receive end, configured to perform the data processing method in the first aspect or each possible implementation of the first aspect. The receive end includes a processor and a transceiver. The processor is configured to perform operations of determining, obtaining, and the like in the data processing method, and the transceiver is configured to perform operations of receiving, sending, and the like in the data processing method. The receive end provided in the third aspect has a same or similar technical effect as the first aspect or each possible implementation of the first aspect. Details are not described herein again.

A fourth aspect of the embodiments of the present application provides a transmission control device, configured to perform the data processing method in the second aspect or each possible implementation of the second aspect. The transmission control device includes a processor and a transceiver. The processor is configured to perform operations of allocating, determining, and the like in the data processing method, and the transceiver is configured to perform operations of receiving, sending, and the like in the data processing method. The transmission control device provided in the fourth aspect has a same or similar technical effect as the second aspect or each possible implementation of the second aspect. Details are not described herein again.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show some embodiments of the present application, and a person of ordinary skill in the art may still derive other drawings from these accompanying drawings without creative efforts.

DESCRIPTION OF EMBODIMENTS

Figure 1:
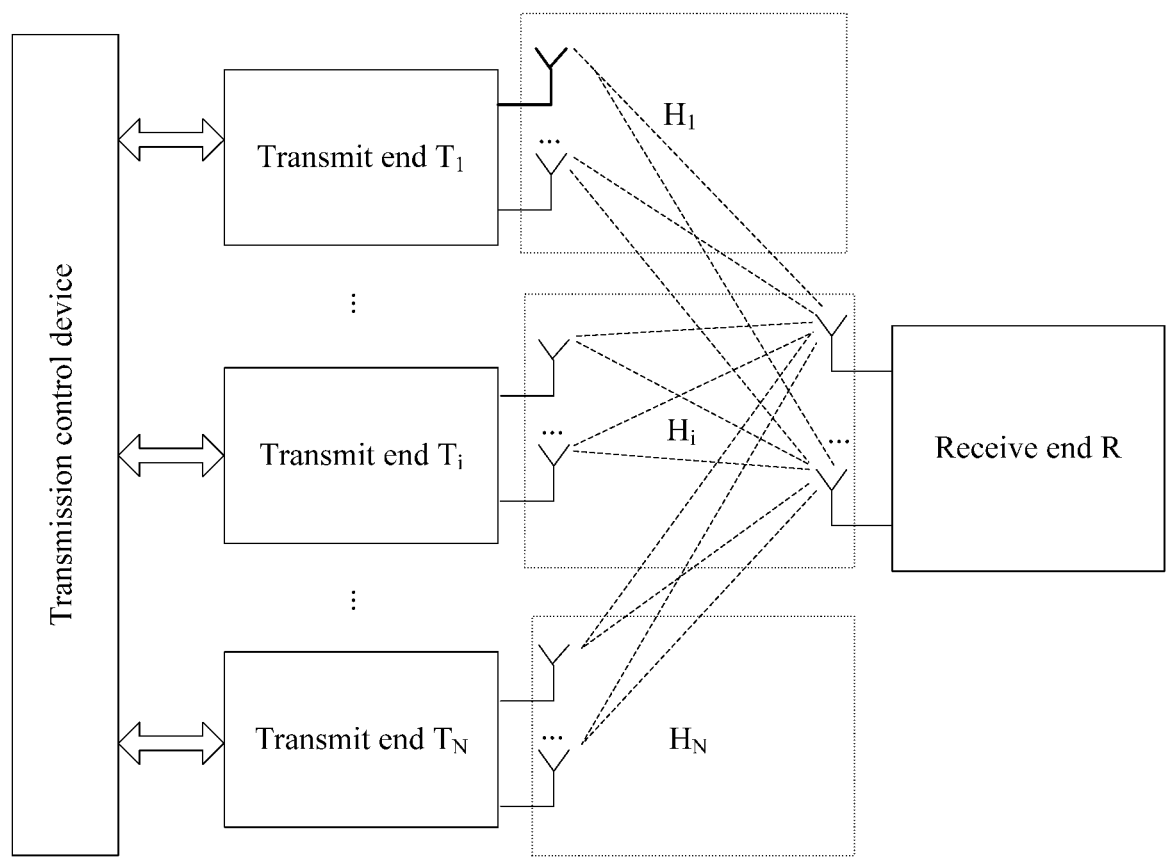
FIG. 1 is a schematic architectural diagram of a MIMO wireless communications system according to an embodiment of the present application.

An aspect of the embodiments of the present application provides a data transmission method that is applicable to a MIMO wireless communications system. As shown in FIG. 1, the MIMO wireless communications system includes N (an integer greater than 1) transmit ends ($T_1, \ldots, T_i, \ldots,$ and $T_N$, where i is any integer of 1 to N), at least one receive end (R), and one transmission control device. The transmission control device is optional in the MIMO wireless communications system.

A channel between a transmit end and a receive end may be referred to as a spatial channel. Considering that a transmit end includes at least one transmit antenna and a receive end includes at least one receive antenna, a channel from the transmit end to the receive end includes at least a plurality of paths (indicated by dashed lines in FIG. 1). In these paths, a path in a direction from receive end to the transmit end may be collectively referred to as an uplink, and a path in a direction from a transmit end to the receive end may be collectively referred to as a downlink. Correspondingly, a spatial channel in a direction from the receive end to a transmit end is an uplink spatial channel, and a spatial channel in a direction from a transmit end to the receive end is a downlink spatial channel.

A spatial channel may be determined by time, frequency, and space. A spatial channel includes a control channel used to transmit control signaling and a service channel used to transmit service data. Both the control signaling and the service data are transmitted through the spatial channel. When the MIMO wireless communications system is a Long Term Evolution system, the communications system comprises a physical layer, a media access control layer, a radio resource control layer, and the like according to a division of a protocol layers. At the physical layer, the control channel includes a physical uplink control channel (PUCCH) in the uplink and includes a physical downlink control channel (PDCCH) in the downlink. The physical downlink control channel includes downlink control information (DCI). The downlink control information may include a plurality of types of indication information, for example, may indicate a service data transmission manner, a location of a resource for transmitting the service data, a service data retransmission manner.

A spatial channel has characteristics of changing an amplitude and a phase of a signal transmitted on the spatial channel and the like, and may be mathematically represented by using a channel matrix. Without loss of generality, a spatial channel between an $i^{th}$ transmit end and the receive end is represented by using a channel matrix $H_i$. When the MIMO system is a time division multiplexing (TDD) system, because of channel reciprocity, an uplink spatial channel is approximately the same as a downlink spatial channel. A channel matrix of one of the uplink spatial channel and the downlink spatial channel is obtained by measuring the other spatial channel.

Based on the foregoing descriptions, in the embodiments of the present application, it may be determined, based on an information transmission direction (from the transmit end to the receive end or from the receive end to the transmit end), whether information is transmitted on the uplink spatial channel (or referred to as the uplink) or the downlink spatial channel (or referred to as the downlink).

Figure 2:
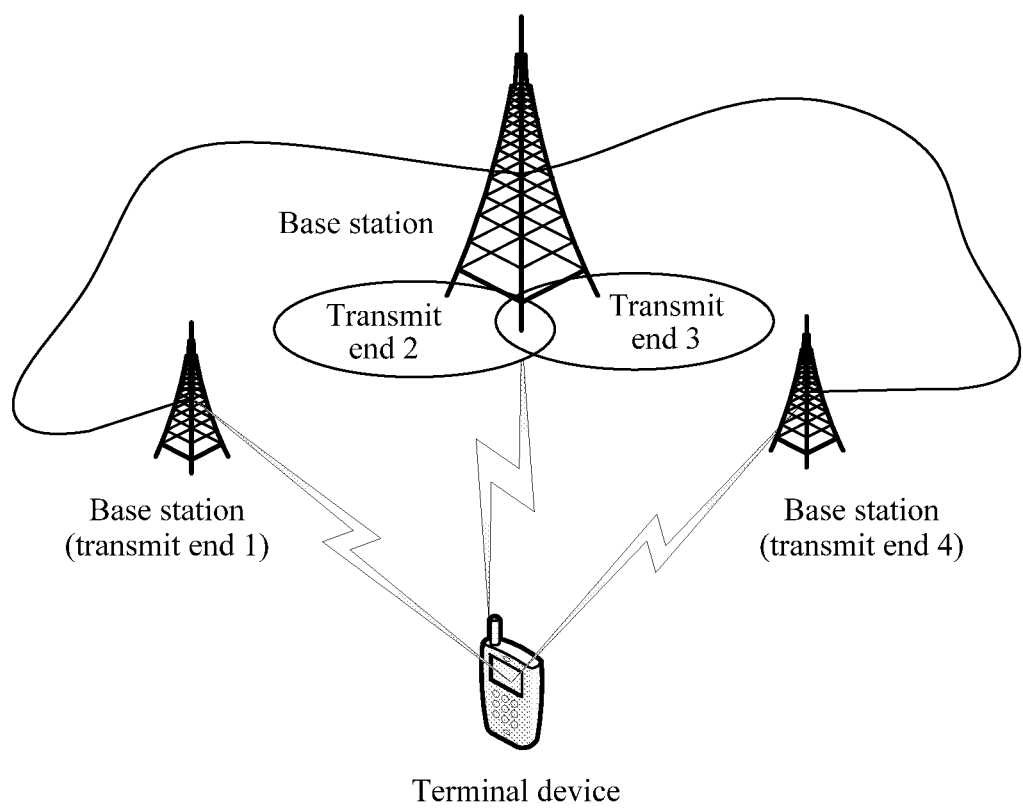
FIG. 2 is a schematic diagram of networking between a base station and a terminal device according to an embodiment of the present application.

In a MIMO wireless communications system shown in FIG. 2, each transmit end may be an access network device, for example, a base station, and the base station may be a macro base station, a small cell (small cell base station), or the like. Alternatively, each transmit end may be a logical functional entity of an access network device, for example, cells of a same base station or cells of different base stations. Alternatively, each transmit end may be a different subarray of large-scale array antennas of a same cell, and these subarrays do not need to be calibrated with each other. A receive end is a terminal device served by a base station. A transmission control device is a logical functional entity, and may be a device (for example, a core network device) independent of N transmit ends, may be one of the N transmit ends, or may be a network management system running on the core network device and at least one of the N transmit ends.

An aspect of the embodiments of the present application provides a data processing method. As shown in a schematic flowchart in FIG. 3 and a schematic diagram of internal logic processing in a MIMO communications system in FIG. 4, the method includes the following operations.

In operation 301, before channel coding, a transmission control device divides one data flow into N sub-data flows and allocates the N sub-data flows to N transmit ends, where N is an integer greater than 1. In one embodiment, N is not greater than a quantity of receive antennas of a receive end.

In this operation, the data flow obtained by the transmission control device may be a service data such as voice, a text, a video, and an image, and also include all types of control signaling. The transmission control device segments the data flow, to obtain the N sub-data flows, and allocates the N sub-data flows to the N transmit ends controlled by the transmission control device. One sub-data flow is allocated to each transmit end. A size of each sub-data flow may be determined based on a physical resource that can be used by each transmit end to send data, a quantity of codewords that can be concurrently processed by each transmit end, and a modulation and coding scheme (MCS) used by each transmit end. A modulation scheme mainly includes binary phase shift keying (BPSK), quadrature phase shift keying (QPSK), quadrature amplitude modulation (QAM), and the like, and a coding scheme mainly includes a turbo code, a convolutional code, a low-density parity-check code (LDPC), and the like that have different code rates.

In operation 302, the transmission control device instructs each of the N transmit ends to send an allocated sub-data flow to a same receive end on a same time-frequency resource.

To avoid impact caused by a transmission delay, a resource may be preallocated and indicated to each transmit end before the transmit end sends the allocated sub-data flow.

In operation 303, the receive end sends first indication information to each transmit end, where the first indication information includes at least one of the following: a quantity of MIMO layers of a codeword that carries an allocated sub-data flow when the transmit end sends the allocated sub-data flow, and a reference modulation and coding scheme of the codeword that carries the sub-data flow when the transmit end sends the allocated sub-data flow. When a transmit end sends an allocated sub-data flow, data of the sub-data flow may be carried in one or more codewords. A sum of a quantity of MIMO layers of the codeword of the transmit end and quantities of MIMO layers of codewords of other (N−1) transmit ends is not greater than the quantity of receive antennas of the receive end.

In the operation, the receive end may further notify each transmit end of channel state information of each downlink spatial channel, so that each transmit end determines a quantity of MIMO layers, a precoding matrix, a modulation and coding scheme, and the like during sending of the sub-data flow, or the transmission control device determines, for each transmit end, a quantity of MIMO layers, a precoding matrix, a modulation and coding scheme, and the like during sending of the sub-data flow.

Channel state information of a downlink spatial channel includes a precoding matrix indication, a channel quality indicator, and a rank indication of the downlink spatial channel.

The channel quality indicator may be used as a reference for determining a modulation and coding scheme during sending of a sub-data flow, and the precoding matrix indication fed back by the receive end may be used to determine a precoding matrix during sending of the sub-data flow.

A total quantity of layers of MIMO layer mapping performed when the N transmit ends send the allocated sub-data flows is not greater than the total quantity of receive antennas of the receive end. The receive end may calculate a quantity of MIMO layers that is used when a transmit end corresponding to each downlink spatial channel sends an allocated sub-data flow, and notify, by using a rank indication, the transmit end corresponding to the downlink spatial channel of the quantity of MIMO layers.

In the operation, a transmit end $T_i$ is used as an example. The transmit end $T_i$ receives channel state information of a downlink spatial channel matrix $H_i$ from the receive end. The channel state information of the downlink spatial channel matrix $H_i$ includes at least one of a precoding matrix indication $PMI_i$, a channel quality indicator $CQI_i$, and a rank indication $RI_i$, and the rank indication $RI_i$ is used by the transmit end $T_i$ to determine a quantity of layers of MIMO performed on a sub-data flow i. The transmit end $T_i$ may reselect, based on $PMI_i$ and $CQI_i$, a precoding matrix for sending the allocated sub-data flow i, adjust MIMO layer mapping based on $RI_i$, and may further determine a modulation and coding scheme based on $CQI_i$.

It can be learned from 303 that the quantity of MIMO layers of each transmit end may be actually determined by the receive end and fed back by using the channel state information.

In parallel with the operation 303, this embodiment of the present application further includes: operation 303'. The transmission control device controls, by using uplink and downlink propagation channel reciprocity (channel reciprocity), each transmit end $T_i$ to measure an uplink reference signal, determines a quantity of MIMO layers and a precoding matrix for each transmit end $T_i$ based on a measurement result, and notifies each transmit end of the quantity of MIMO layers and the precoding matrix.

In a time division multiplexing system, because an uplink spatial channel is approximately the same as a downlink spatial channel, the transmission control device may determine the precoding matrix and the quantity of MIMO layers for each transmit end through channel estimation of the uplink spatial channel. A sum of quantities of MIMO layers of all transmit ends is still not greater than the quantity of receive antennas of the receive end.

In operation 304, each transmit end sends the allocated sub-data flow to the receive end on the same time-frequency resource.

In the operation, each transmit end performs channel coding, scrambling, MIMO layer mapping and precoding, physical resource mapping, and OFDM symbol generation on the allocated sub-data flow, and sends the allocated sub-data flow on the same time-frequency resource by using at least one transmit antenna.

In the operation, without loss of generality, for example, the sub-data flow i is allocated to the transmit end $T_i$, and the transmit end $T_i$ performs $L_i$ layers of MIMO layer mapping when sending the sub-data flow i. The sub-data flow i is converted into $C_i$ transport blocks (TB) before channel coding is performed on the sub-data flow i at a media access control layer of the transmit end $T_i$. $C_i$ codewords are obtained after channel coding performed on the $C_i$ transport blocks separately. After scrambling, modulation, $L_i$ layers of MIMO layer mapping, and precoding are performed, the $C_i$ codewords are mapped onto $P_i$ logical antenna ports. Then, after physical resource mapping and OFDM symbol generation are performed, the allocated sub-data flow is sent to the receive end on $X_i$ transmit physical antennas. It should be noted that $C_1, \ldots, C_i, \ldots,$ and $C_N$ may all be 1. In this case, each transmit end generates only one codeword. Each of all the transmit ends may also perform only one layer of MIMO layer mapping on the allocated sub-data flow.

Apparently, a person skilled in the art may understand that $C_1, \ldots, C_i, \ldots,$ and $C_N$ are all positive integers, $P_1, \ldots, P_i, \ldots,$ and $P_N$ are all positive integers, $X_1, \ldots, X_i, \ldots,$ and $X_N$ are all positive integers, and $L_1, \ldots, L_i, \ldots,$ and $L_N$ are all positive integers.

It can be learned from the foregoing descriptions that, when $C_1, \ldots, C_i, \ldots,$ and $C_N$ are all 1, each transmit end generates only one codeword. Moreover, when $L_1, \ldots, L_i, \ldots,$ and $L_N$ are all 1, each transmit end performs only one layer of MIMO layer mapping on the only one generated codeword. When $L_1, \ldots, L_i, \ldots,$ and $L_N$ are all not limited to 1, each transmit end may perform at least one layer of MIMO layer mapping on the one generated codeword (a specific quantity of layers may be notified by the transmission control device or notified by the receive end; for example, refer to 303 and 303').

In the operation, for channel coding, scrambling, modulation, physical resource mapping, and OFDM symbol generation, refer to an existing 3GPP protocol specification, and details are not described herein.

In the operation, this embodiment of the present application provides a specific implementation of a MIMO layer mapping method. For example, the transmit end $T_i$ may perform $L_i$ layers of MIMO layer mapping in the following specific manner. In this manner, $L_i$ is greater than or equal to $C_i$.

It is assumed that data of a codeword c of the $C_i$ codewords is indicated as $d^c(m)$, $0 \leq m \leq Q^c$, and data of layer l of the $L_i$ layers of MIMO layer mapping is indicated as $x^l(m)$, $0 \leq m \leq Q^{layer}$, where a data size of each codeword may be divisible by $Q^{layer}$, and both $Q^c$ and $Q^{layer}$ are positive integers. Therefore, a quantity of layers corresponding to each codeword is $L^c = Q^c / Q^{layer}$, and $$L_i = \sum_{c=0}^{c<Ci} L^c$$

is satisfied. A MIMO layer mapping relationship of the codeword c may be indicated as:

$$\begin{cases} x^{Lp}(m) = d^c(L^c \cdot m) \\ x^{Lp+1}(m) = d^c(L^c \cdot m + 1) \\ x^{Lp+L^c-1}(m) = d^c(L^c \cdot m + L^c - 1), \end{cases}$$

where $$L_p = \sum_{i=0}^{i<c} L^i$$

indicates a quantity of MIMO layers from a codeword 0 to a codeword (c−1) (the quantity of MIMO layers of each transmit end may be determined based on the rank indication in the channel state information sent by the receive end).

In the operation, this embodiment of the present application further provides an example in which the transmit end $T_i$ performs precoding, and specifically, the following manner may be used.

It is assumed that data on a logical antenna port p is $y^p(m)$, $0 \cdot m \leq Q^{layer}$, and a precoding matrix of the transmit end is $W_m$. Dimensions of the matrix are $P_m \times L_m$, and $P_m \geq L_m$ is satisfied. A precoding process is indicated as:

$$\left\{\begin{array}{c} y^{(0)}(m) \\ M \\ y^{(P_m-1)}(m) \end{array}\right\} = W_m \cdot \left\{\begin{array}{c} x^{(0)}(m) \\ M \\ x^{(L_m-1)}(m) \end{array}\right\}$$

The precoding matrix $W_m$ may be determined based on the precoding matrix indication and the channel quality indicator in the channel state information sent by the receive end.

In operation 305, the receive end receives, on the same time-frequency resource, the sub-data flow sent by each transmit end.

Before the receive end receives the sub-data flow from each transmit end, the receive end may receive downlink control information of each transmit end. The downlink control information includes at least one of the following: a serial number of the transmit end in the N transmit ends, a quantity of codewords and a modulation and coding scheme of each codeword when the transmit end sends an allocated sub-data flow, a MIMO layer and a correspondence between a MIMO layer and a codeword when the transmit end sends the allocated sub-data flow, a correspondence between a MIMO layer and a logical antenna port when the transmit end sends the allocated sub-data flow, and a precoding matrix indication when the transmit end sends the allocated sub-data flow.

The downlink control information of each transmit end may be carried in only a control channel from one of the N transmit ends to the receive end (which is also referred to as centralized transmission of the downlink control information). The receive end may learn of downlink control information of all the transmit ends by detecting the control channel from the transmit end to the receive end.

Alternatively, the downlink control information of each transmit end may be carried in a control channel from the transmit end to the receive end (which is also referred to as distributed transmission of the downlink control information). The receive end may learn of downlink control information of all the transmit ends by detecting each control channel from each transmit end to the receive end.

The method further includes: operation 306. After each transmit end sends the allocated sub-data flow, the receive end may send, to each transmit end, second indication information indicating whether the sub-data flow is correctly received, for example, acknowledgement (ACK) information or negative acknowledgement (NACK) information. If a transmit end receives a negative acknowledgement, the transmit end may need to retransmit an allocated sub-data flow.

By applying the technical solution provided in this embodiment of the present application, a plurality of sub-data flows divided from one data flow are delivered by the transmission control device to each transmit end in a unified manner and are sent on the same time-frequency resource, and the transmit ends no longer need to coordinate with each other through direct signaling interworking, thereby lowering a timing synchronization requirement between the transmit ends, and reducing implementation complexity of the MIMO communications system. Different transmit ends may send allocated sub-data flows to a same receive end on a same time-frequency resource. In an aspect, a total quantity of data flows on the same time-frequency resource of the receive end is increased. Particularly, when a quantity of antennas of the receive end is greater than a quantity of antennas of a transmit end, a throughput of the receive end can be improved. In another aspect, the receive end receives different sub-data flows of the same data flow from the different transmit ends. In this case, interference between sub-data flows sent by two different transmit ends becomes interference between two sub-data flows of the same data flow, and the receive end may reduce the interference by using an advanced receiver algorithm for the same data flow, thereby improving spectral efficiency. In still another aspect, the receive end determines a quantity of MIMO layers of each transmit end, and each transmit end no longer needs to perform signaling coordination. Therefore, implementation complexity of each transmit end can be reduced.

To implement a method for mapping MIMO layer data onto an antenna port in the foregoing embodiment, another aspect of the embodiments of the present application further includes the following content.

After performing MIMO layer mapping but before performing precoding on the allocated sub-data flow, each transmit end generates MIMO layer data before precoding. Then, if precoding is performed, MIMO layer data after precoding is formed. The MIMO layer data before precoding or the MIMO layer data after precoding is collectively referred to as MIMO layer data in the following embodiments of the present application. Currently, in a Long Term Evolution system, a MIMO transmission mode is classified into a transmission mode 1 (TM1) to a transmission mode 9 (TM9). For a specific method for mapping a MIMO layer data onto a logical antenna port in each transmission mode, refer to the 3GPP protocol.

In this embodiment of the present application, that N=2 and a transmit end uses the transmission mode 9 (TM9) is used as an example to describe the method for mapping a MIMO layer data onto an antenna port in the foregoing data processing method.

It is assumed that a transmit end 1 uses TM9 single-layer transmission and a transmit end 2 uses TM9 dual-layer transmission.

Based on a spatial multiplexing layer mapping manner in Table 1-A, the transmit end 1 (whose serial number is 0) performs one-codeword single-layer mapping based on the first row, and the transmit end 2 (whose serial number is 1) performs dual-codeword dual-layer mapping based on the third row. In order of serial number, statistics is performed on a total quantity of MIMO layers of all transmit ends whose serial numbers are less than a serial number of a current transmit end (the current transmit end is included).

A total quantity of MIMO layers of the transmit end 1 is 1, and a total quantity of MIMO layers of the transmit end 2 is 3.

More generally, the foregoing MIMO layer mapping manner may be performed in the following manner.

An identifier of a transmit end is indicated by using a serial number of the transmit end. A value is an integer from 0 to (N−1). For the transmit end i (0≤i≤N−1), a quantity of codewords is $C_i$, and a quantity of layers is $L_i$. An equivalent total quantity of MIMO layers of the transmit end i is:

$$L'_i = \sum_{m=0}^{m \leq i} L_m$$

The equivalent total quantity of MIMO layers is a total quantity of layers of all transmit ends that include the transmit end i and transmit ends whose serial numbers are less than i.

It should be noted that, in this example, each of the N transmit ends sends the downlink control information to the receive end (distributed transmission). Downlink control information sent by a transmit end to the receive end includes a serial number of the transmit end. The receive end may determine a mapping between a MIMO layer and an antenna port based on the serial number of the transmit end. A serial number of a transmit end may occupy 1 to 3 bits in downlink control information.

Specifically, each transmit end determines, based on Table 1-B, an antenna port onto which a codeword of the allocated sub-data flow is mapped.

TABLE 1-A

Mapping between a codeword and a layer

| Quantity of MIMO layers corresponding to a transmit end | Total codewords corresponding to a transmit end | Mapping between a codeword and a layer | $i = 0, 1, \ldots, M_{symb}^{layer} - 1$ |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$<br>$x^{(1)}(i) = d^{(0)}(2i+1)$ | $M_{symb}^{layer} = M_{symb}^{(0)}/2$ |
| 2 | 2 | $x^{(0)}(i) = d^{(0)}(i)$<br>$x^{(1)}(i) = d^{(1)}(i)$ | $M_{symb}^{layer} = M_{symb}^{(0)} = M_{symb}^{(1)}$ |
| 3 | 1 | $x^{(0)}(i) = d^{(0)}(3i)$<br>$x^{(1)}(i) = d^{(0)}(3i+1)$<br>$x^{(2)}(i) = d^{(0)}(3i+2)$ | $M_{symb}^{layer} = M_{symb}^{(0)}/3$ |
| 3 | 2 | $x^{(0)}(i) = d^{(0)}(i)$<br>$x^{(1)}(i) = d^{(1)}(2i)$<br>$x^{(2)}(i) = d^{(1)}(2i+1)$ | $M_{symb}^{layer} = M_{symb}^{(0)} = M_{symb}^{(1)}/2$ |
| 4 | 1 | $x^{(0)}(i) = d^{(0)}(4i)$<br>$x^{(1)}(i) = d^{(0)}(4i+1)$<br>$x^{(2)}(i) = d^{(0)}(4i+2)$<br>$x^{(3)}(i) = d^{(0)}(4i+3)$ | $M_{symb}^{layer} = M_{symb}^{(0)}/4$ |
| 4 | 2 | $x^{(0)}(i) = d^{(0)}(2i)$<br>$x^{(1)}(i) = d^{(0)}(2i+1)$<br>$x^{(2)}(i) = d^{(1)}(2i)$<br>$x^{(3)}(i) = d^{(1)}(2i+1)$ | $M_{symb}^{layer} = M_{symb}^{(0)}/2 = M_{symb}^{(1)}/2$ |

TABLE 1-B

Mapping between a layer and a logical antenna port

| One codeword in total: codeword 0 is available, and codeword 1 is not available | | Two codewords in total: codeword 0 is available, and codeword 1 is available | |
|---|---|---|---|
| Serial number of a transmit end | Between a MIMO layer and a logical antenna port | Serial number of a transmit end | Between a MIMO layer and a logical antenna port |
| 0 | 1 layer, port 7, $n_{SCID} = 0$ | 0 | 2 layers, ports 7 and 8, $n_{SCID} = 0$ |
| 1 | 1 layer, port 7, $n_{SCID} = 1$ | 1 | 2 layers, ports 7 and 8, $n_{SCID} = 1$ |
| 2 | 1 layer, port 8, $n_{SCID} = 0$ | 2 | 3 layers, ports 7 to 9 |
| 3 | 1 layer, port 8, $n_{SCID} = 1$ | 3 | 4 layers, ports 7 to 10 |
| 4 | 2 layers, ports 7 and 8 | 4 | 5 layers, ports 7 to 11 |
| 5 | 3 layers, ports 7 to 9 | 5 | 6 layers, ports 7 to 12 |
| 6 | 4 layers, ports 7 to 10 | 6 | 7 layers, ports 7 to 13 |
| 7 | Reserved | 7 | 8 layers, ports 7 to 14 |

To implement the method for mapping MIMO layer data onto an antenna port, in another example, this embodiment of the present application further includes the following content.

In this example, downlink control information from one of the N transmit ends to the receive end (centralized transmission) includes a MIMO layer and a correspondence between a MIMO layer and a codeword when each transmit end sends the allocated sub-data flow, and a correspondence between a MIMO layer and a logical antenna port when each transmit end sends the allocated sub-data flow. During the centralized transmission of the downlink control information, the downlink control information may not include a serial number of each transmit end.

N=2 is used as an example. A maximum total quantity of MIMO layers of a sub-data flow allocated to a transmit end is 4. In this case, a mapping between a codeword and a MIMO layer may be determined based on Table 2-A, and a mapping between a MIMO layer and an antenna port may be determined based on Table 2-B.

TABLE 2-A

Mapping between a codeword and a layer (a maximum of 4 layers)

| Quantity of MIMO layers corresponding to a transmit end | MIMO layer allocation manner (codeword 0, codeword 1) | Total quantity of codewords corresponding to a transmit end | Mapping between a codeword and a MIMO layer | $i = 0, 1, \ldots, M_{symb}^{layer} - 1$ |
|---|---|---|---|---|
| 1 | (1, 0) | 1 | $x^{(0)}(i) = d^{(0)}(i)$ | $M_{symb}^{layer} = M_{symb}^{(0)}$ |
| 2 | (1, 1) | 2 | $x^{(0)}(i) = d^{(0)}(i)$<br>$x^{(1)}(i) = d^{(1)}(i)$ | $M_{symb}^{layer} = M_{symb}^{(0)} = M_{symb}^{(1)}$ |
| 3 | (1, 2) | 2 | $x^{(0)}(i) = d^{(0)}(i)$<br>$x^{(1)}(i) = d^{(1)}(2i)$<br>$x^{(2)}(i) = d^{(1)}(2i+1)$ | $M_{symb}^{layer} = M_{symb}^{(0)} = M_{symb}^{(1)}/2$ |

TABLE 2-A-continued

Mapping between a codeword and a layer (a maximum of 4 layers)

| Quantity of MIMO layers corresponding to a transmit end | MIMO layer allocation manner (codeword 0, codeword 1) | Total quantity of codewords corresponding to a transmit end | Mapping between a codeword and a MIMO layer $i = 0, 1, \ldots, M_{symb}^{layer} - 1$ | |
|---|---|---|---|---|
| 3 | (2, 1) | 2 | $x^{(0)}(i) = d^{(0)}(2i)$ $x^{(1)}(i) = d^{(0)}(2i+1)$ $x^{(2)}(i) = d^{(1)}(i)$ | $M_{symb}^{layer} = M_{symb}^{(0)}/2 = M_{symb}^{(1)}$ |
| 4 | (2, 2) | 2 | $x^{(0)}(i) = d^{(0)}(2i)$ $x^{(1)}(i) = d^{(0)}(2i+1)$ $x^{(2)}(i) = d^{(1)}(2i)$ $x^{(3)}(i) = d^{(1)}(2i+1)$ | $M_{symb}^{layer} = M_{symb}^{(0)}/2 = M_{symb}^{(1)}/2$ |
| 4 | (1, 3) | 2 | $x^{(0)}(i) = d^{(0)}(i)$ $x^{(1)}(i) = d^{(1)}(3i)$ $x^{(2)}(i) = d^{(1)}(3i+1)$ $x^{(3)}(i) = d^{(1)}(3i+2)$ | $M_{symb}^{layer} = M_{symb}^{(0)} = M_{symb}^{(1)}/3$ |
| 4 | (3, 1) | 2 | $x^{(0)}(i) = d^{(0)}(3i)$ $x^{(1)}(i) = d^{(0)}(3i+1)$ $x^{(2)}(i) = d^{(0)}(3i+2)$ $x^{(3)}(i) = d^{(1)}(i)$ | $M_{symb}^{layer} = M_{symb}^{(0)}/3 = M_{symb}^{(1)}$ |

Further, a codeword that has undergone MIMO layer mapping may be mapped onto a corresponding antenna port based on a mapping relationship between an antenna port and a codeword in Table 2-B.

TABLE 2-B

Mapping between a layer and an antenna port (a maximum of 8 antenna ports, such as ports 46 to 53)

| Information bit | MIMO layer allocation manner (codeword 0, codeword 1) | Used antenna port |
|---|---|---|
| 000000-000111 | 1 | 46/47/48/49/50/51/52/53 |
| 001000-001110 | 1 + 1 | (46, 47)/(47, 48)/(48, 49)/(49, 50)/(50, 51)/(51, 52)/(52, 53) |
| 001111-010100 | 1 + 2 | (46, 47, 48)/(47, 48, 49)/(48, 49, 50)/(49, 50, 51)/(50, 51, 52)/(51, 52, 53) |
| 010101-011010 | 2 + 1 | (46, 47, 48)/(47, 48, 49)/(48, 49, 50)/(49, 50, 51)/(50, 51, 52)/(51, 52, 53) |
| 011011-011111 | 2 + 2 | (46, 47, 48, 49)/(47, 48, 49, 50)/(48, 49, 50, 51)/(49, 50, 51, 52)/(50, 51, 52, 53) |
| 100000-100100 | 1 + 3 | (46, 47, 48, 49)/(47, 48, 49, 50)/(48, 49, 50, 51)/(49, 50, 51, 52)/(50, 51, 52, 53) |
| 100101-101001 | 3 + 1 | (46, 47, 48, 49)/(47, 48, 49, 50)/(48, 49, 50, 51)/(49, 50, 51, 52)/(50, 51, 52, 53) |

A process in which the receive end performs MIMO layer demapping is a reverse process of the foregoing layer mapping. Details are not described herein.

Figure 5:
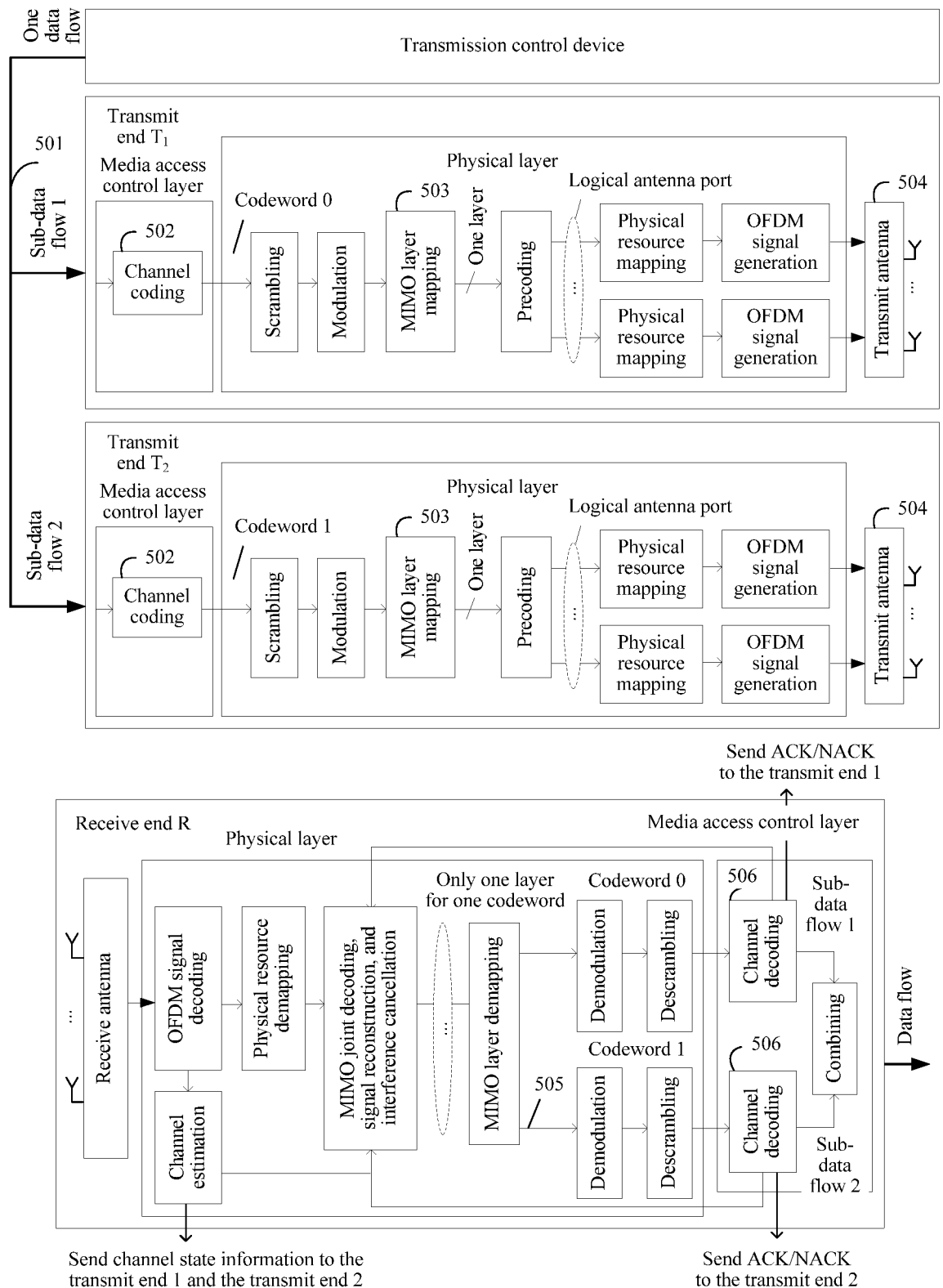
FIG. 5 is a schematic diagram of internal logic processing in a MIMO wireless communications system according to an embodiment of the present application.

Another aspect of the embodiments of the present application provides a data processing method, applied to internal logic processing in a MIMO communications system shown in FIG. 5. In a schematic data processing flowchart shown in FIG. 5, the data processing method in the foregoing embodiments is further simplified, and same content may not be described in detail again.

In a data processing process shown in FIG. 5, for example, a total quantity N of transmit ends is 2, and each transmit end generates only one codeword after performing channel coding on an allocated sub-data flow, and generates only one MIMO layer when performing MIMO layer mapping on the codeword. The data processing process shown in FIG. 5 includes the following content.

In operation 501, a transmission control device segments one data flow into two sub-data flows, and allocates the two sub-data flows to the two transmit ends (a transmit end $T_1$ and a transmit end $T_2$).

In the operation, the transmission control device may be one of the two transmit ends, a core network device, or a network management system. The transmission control device delivers the data flow in a unified manner.

In operation 502, the two transmit ends each perform channel coding on an allocated sub-data flow, and each transmit end generates only one codeword.

In the operation, the transmit end $T_1$ generates a codeword 0, and the transmit end $T_2$ generates a codeword 1.

In operation 503, after the two transmit ends each perform scrambling, modulation mapping, and MIMO layer mapping on the one generated codeword, each transmit end generates only one layer of MIMO layer data.

In the operation, a quantity of MIMO layers of each transmit end is only 1. Unlike the foregoing embodiment, the quantity of MIMO layers used when each transmit end sends the allocated sub-data flow may no longer need to be determined by a receive end or the transmission control device. Therefore, implementation is simpler.

In operation 504, after performing precoding, physical resource mapping, and OFDM symbol generation on the layer of generated MIMO layer data, the two transmit ends each send the layer of MIMO layer data on a same time-frequency resource by using at least one physical antenna.

In the operation, the receive end may perform channel measurement and channel estimation on a downlink spatial channel from each of the two transmit ends to the receive end, to determine channel state information of the downlink spatial channel, and separately send the channel state information to the two transmit ends.

In an aspect, the two transmit ends may separately receive the channel state information of the downlink spatial channel from the same receive end, and adjust selection of a precoding matrix of the allocated sub-data flow based on a precoding matrix indication and a channel quality indicator in the received channel state information of the downlink spatial channel.

In another aspect, the two transmit ends may alternatively send the received channel state information of the downlink spatial channel to the transmission control device by using the two transmit ends, and the transmission control device adjusts selection of a precoding matrix and then notifies the two transmit ends of an adjusted precoding matrix.

In operation 505, a receive end receives downlink OFDM signals from the two transmit ends, and performs OFDM signal decoding, only one layer of MIMO layer demapping, and channel decoding for one codeword.

In operation 506, the receive end determines, by separately performing the channel decoding on one codeword of the two transmit ends, whether the sub-data flows sent by the two transmit ends are correctly received.

For either of the two transmit ends, the receive end may determine, in an error correction and checking manner, whether a sub-data flow of the transmit end is correctly received. If the receive end correctly receives the sub-data flow of the transmit end, the receive end sends an acknowledgement (ACK) to the transmit end. If the receive end does not correctly receive the sub-data flow sent by the transmit end, the receive end sends a negative acknowledgement (NACK) to the transmit end, so that the transmit end retransmits the sub-data flow.

If the receive end correctly receives both the sub-data flows sent by the two transmit ends, the receive end combines the two sub-data flows, to obtain the entire data flow.

In this embodiment, each transmit end performs one layer of MIMO layer mapping and generates one codeword, and there is no need to calculate the quantity of layers of MIMO layer mapping. In this case, implementation of a MIMO communications system is simplest.

Figure 6:
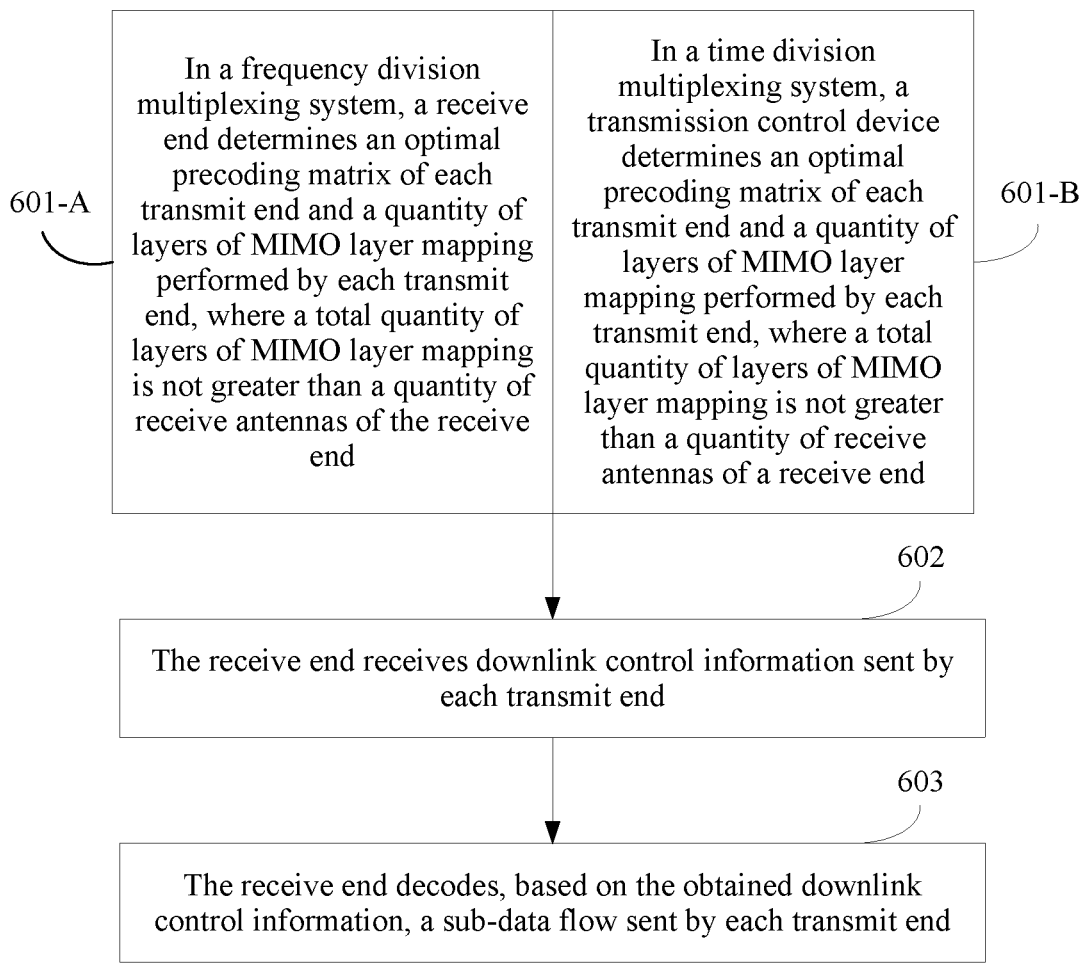
FIG. 6 is a schematic flowchart of another data processing method according to an embodiment of the present application.

An aspect of the embodiments of the present application provides a data processing method. FIG. 6 is a schematic flowchart of the data processing method. This embodiment is a further supplementary description of the foregoing embodiments, and same content may not be described in detail again.

In operation 601, a receive end obtains channel state information of a downlink spatial channel, where the channel state information is determined by performing orthogonalization on a spatial channel between each of N transmit ends and the receive end.

In the operation, in a frequency division multiplexing system, the receive end determines a quantity of MIMO layers when each transmit end sends a sub-data flow, and notifies each transmit end of the quantity of MIMO layers by using a rank indication in the channel state information. A sum of quantities of layers of MIMO layer mapping when all transmit ends send sub-data flows is not greater than a quantity of receive antennas of the receive end.

In the operation, in the frequency division multiplexing system, the receive end may determine channel state information of a downlink spatial channel from each transmit end to the receive end by performing channel parameter estimation on the downlink spatial channel. In a time division multiplexing system, a transmission control device may determine, by performing channel parameter estimation on an uplink spatial channel from the receive end to each transmit end, a precoding matrix of the uplink spatial channel and a quantity of layers of MIMO layer mapping performed by each transmit end, and notifies each transmit end of the precoding matrix and the quantity of layers of MIMO layer mapping so that each transmit end sends them to the receive end in downlink control information. Therefore, in this embodiment of the present application, the following two operations, namely, operation 601-A and operation 601-B, may be included for determining the channel state information of the downlink spatial channel.

In operation 601-A. In a frequency division multiplexing system, the receive end may receive a reference signal sent by each transmit end, where each reference signal is used by the receive end to determine a channel matrix of each downlink spatial channel between each transmit end and the receive end, and perform orthogonalization on the channel matrix of each downlink spatial channel.

In the operation, the reference signal sent by each transmit end is known to the receive end. The receive end calculates the channel matrix ($H_1, H_2, \ldots,$ and $H_N$) of each downlink spatial channel by measuring a change generated after the known reference signal sent by each transmit end is transmitted through each downlink spatial channel, and then performs orthogonalization.

In the operation, a specific orthogonalization manner (based on a constant codebook) includes:

(1) Determine a plurality of precoding matrices of the channel matrix of each downlink spatial channel from the constant codebook based on the calculated channel matrix $H_1, H_2, \ldots,$ and $H_N$ of each downlink spatial channel, and determine an optimal precoding matrix. It is assumed that the optimal precoding matrix of each downlink spatial channel is permuted as $$W = \begin{pmatrix} W_1 & & & & \\ & O & & & \\ & & W_i & & \\ & & & O & \\ & & & & W_N \end{pmatrix}$$

according to a block diagonal matrix. Based on a precoding matrix indication, $W_1$ is selected from a plurality of precoding matrices ($W_{11}, W_{12}, \ldots,$ and $W_{1m}$) by traversing the constant codebook, $W_i$ is selected from ($W_{i1}, W_{i2}, \ldots,$ and $W_{in}$) by traversing the constant codebook, and $W_N$ is selected from ($W_{N1}, W_{N2}, \ldots,$ and $W_{Nx}$) by traversing the constant codebook, where m, n, . . . , and x are quantities of the plurality of precoding matrices, and a value may be determined based on a design of each constant codebook. Generally, m=n= . . . =x=3.

(2) Determine an orthogonalization criterion (which is also referred to as a cost function), such as a signal-to-noise ratio maximization criterion and a power maximization criterion, so that H*W satisfies the orthogonalization criterion, and select the optimal precoding matrix of the channel matrix of each downlink spatial channel. For example, for $H_1$, an optimal precoding matrix is $W_1=W_{11}$; for $H_i$, an optimal precoding matrix is $W_i=W_{i2}$; and for $H_N$, an optimal precoding matrix is $W_N=W_{Nx}$. A person skilled in the art may understand that there are various orthogonalization criteria, and an effect of an orthogonalization criterion may be only quasi-orthogonalization, but may not orthogonalization in mathematics.

(3) Determine the channel state information of each downlink spatial channel based on the optimal precoding matrix.

In operation 601-B. In a time division multiplexing system, each transmit end measures a reference signal sent by the receive end on an uplink spatial channel, to determine a channel matrix of the uplink spatial channel.

In the operation, the transmission control device may learn of a channel matrix of each uplink spatial channel from each transmit end, and then obtain a precoding matrix of each downlink spatial channel according to the constant-codebook-based orthogonalization method in operation 601-A. Then, the transmission control device sends the precoding matrix of each downlink spatial channel to the receive end by using downlink control information of at least one transmit end.

In operation 602. The receive end receives downlink control information corresponding to each of the N transmit ends.

In the operation, by blindly detecting the spatial channel from each transmit end to the receive end (for a specific blind detection manner, refer to the prior art), the receive end may obtain the downlink control information corresponding to each transmit end. A transmit end $T_i$ is used as an example. Downlink control information corresponding to the transmit end $T_i$ may include one or more of the following indication information: a modulation and coding scheme used when the transmit end $T_i$ performs modulation on a to-be-sent sub-data flow i, a mapping relationship between $C_i$ codewords and $L_i$ layers when MIMO layer mapping is performed on the sub-data flow i, a correspondence between the sub-data flow i that has undergone precoding and a logical antenna port, a serial number of each transmit end, a same time-frequency resource used for sending the sub-data flow i and used by other transmit ends for sending other sub-data flows, a quantity of transmit ends sending the other sub-data flows, a precoding matrix when each transmit end sends a sub-data flow, and the like.

In operation 603, the receive end receives, based on the obtained downlink control information, a downlink signal sent by each transmit end on a same time-frequency resource of the downlink spatial channel, and obtains a sub-data flow.

For operation 603, refer to a schematic diagram of internal processing logic of receiving a sub-data flow by a receive end in FIG. 6.

Figure 7:
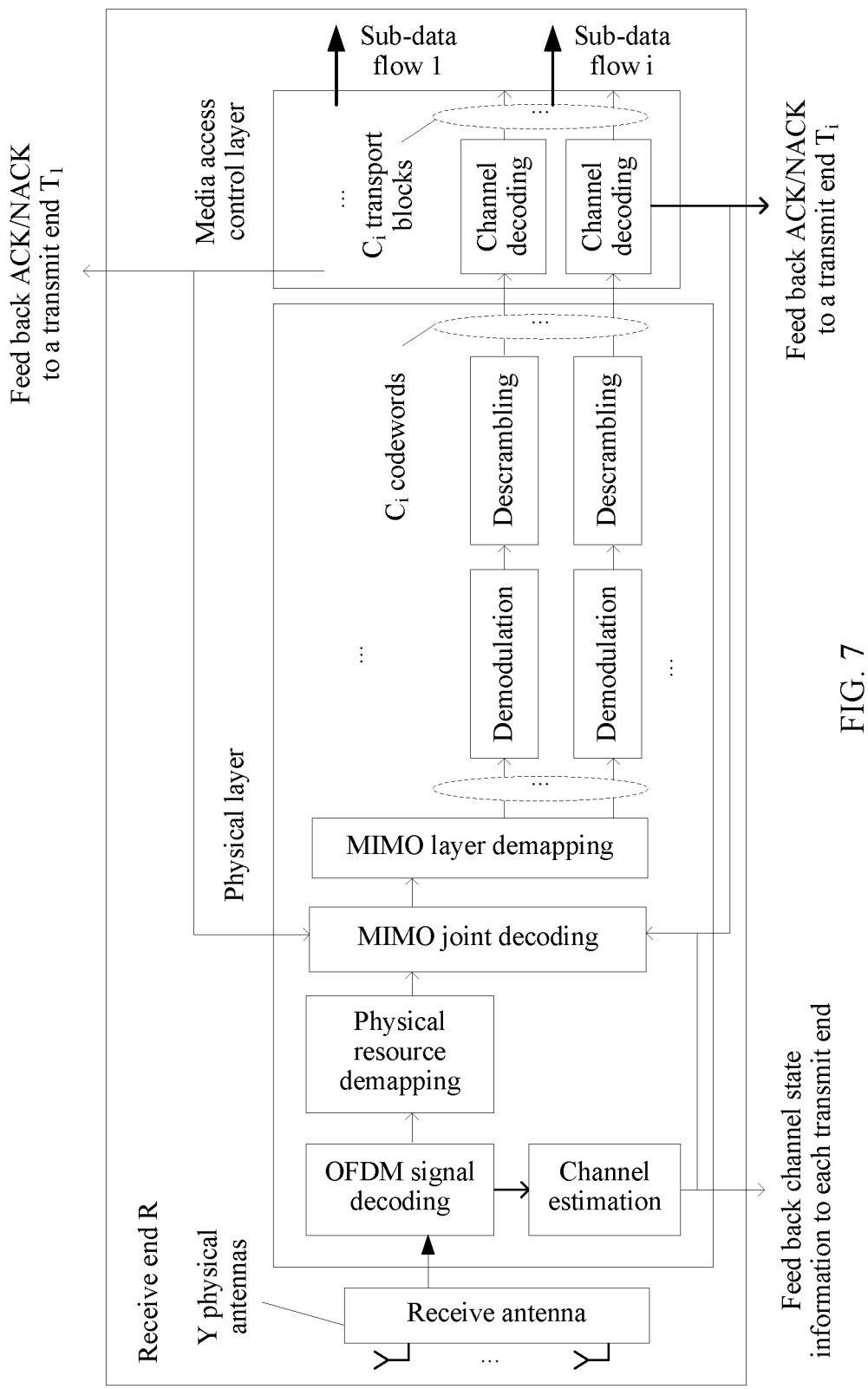
FIG. 7 is a schematic diagram of internal logic decoding processing of a receive end according to an embodiment of the present application.

It should be noted that, in an example, the following manner may be used in a MIMO joint decoding process shown in FIG. 7.

The receive end constructs a matrix $$H = \begin{bmatrix} H_1 \\ M \\ H_i \\ M \\ H_N \end{bmatrix}$$

based on the channel matrix ($H_1, \ldots, H_i, \ldots,$ and $H_N$) of each downlink spatial channel, and constructs a joint precoding matrix $$W = \begin{pmatrix} W_1 & & & & \\ & O & & & \\ & & W_i & & \\ & & & O & \\ & & & & W_N \end{pmatrix}$$

based on the precoding matrix of the channel matrix of the downlink spatial channel, where $W_1$ is a precoding matrix of $H_1$ indicated in the downlink control information, $W_i$ is a precoding matrix of $H_i$ indicated in the downlink control information, and $W_N$ is a precoding matrix of $H_N$ indicated in the downlink control information.

Further, after each sub-data flow is precoded and passes through each spatial channel, an equivalent channel $H' = H \cdot W$ is obtained. The receive end estimates and calculates a coefficient matrix based on a minimum mean square error (MMSE): $\omega = (I + H'^H R_{uu}^{-1} H')^{-1} H'^H R_{uu}^{-1}$, where $R_{uu}$ represents a interference-noise correlation matrix, and $H'^H$ represents conjugate transpose of H'.

Data obtained after MIMO layer demapping performed by the receive end is $\tilde{s} = \omega \tilde{r}$, where $\tilde{r}$ represents a superimposed signal of sub-data flows that are sent by all the transmit ends and that are received by the receive end on Y physical receive antennas.

After performing MIMO layer demapping, the receive end obtains a plurality of codewords of the sub-data flow sent by each transmit end (for example, $C_i$ codewords obtained for the transmit end $T_i$), then obtains a plurality of sub-data flows transmitted through the spatial channel after performing processes such as demodulation, descrambling, and channel decoding on the $C_i$ codewords, and separately performs error correction and checking on these sub-data flows. If error correction and checking performed on a sub-data flow succeeds, it indicates that the sub-data flow is correctly received, and the receive end may send acknowledgement (ACK) information to a transmit end that sends the sub-data flow. If error correction and checking performed on a sub-data flow fails, it indicates that the sub-data flow is not correctly received, and the receive end may send negative acknowledgement (NACK) information to a transmit end that sends the sub-data flow, so that the sub-data flow is retransmitted.

By applying the technical solution in this embodiment of the present application, all channel matrices are used as a whole to determine the channel state information of each downlink spatial channel based on orthogonality between all the channel matrices, instead of individually calculating channel state information of each spatial channel. This can decrease a spatial channel measurement deviation and a spatial channel estimation deviation that are caused by linear correlation between all spatial channels. In this embodiment of the present application, when different sub-data flows are respectively transmitted on various spatial channels after being precoded, a sub-data flow can be orthogonal on different physical transmit antennas of a transmit end, and transmission of the different sub-data flows on different transmit ends can also be orthogonal, thereby reducing interference between the different sub-data flows. In the prior art, a precoding matrix corresponding to each spatial channel is obtained by performing matrix factorization on each channel matrix. In this manner, orthogonality between different channel matrices is not considered. This can ensure that sub-data flows sent by a same transmit end are linearly independent on different physical transmit antennas; but cannot ensure that sub-data flows sent by different transmit ends are orthogonal. As a result, interference is caused between the sub-data flows sent by the different transmit ends. In addition, in the solution provided in this embodiment of the present application, the receive end determines the quantity of layers of MIMO layer mapping performed by each transmit end, and the sum of quantities of layers of MIMO layer mapping performed by all the transmit ends is not greater than the quantity of receive antennas of the receive end. The receive end may notify, by using the rank indication in the channel state information, each transmit end of the quantity of layers of MIMO layer mapping, so that all the transmit ends are decoupled from each other. Implementation is simple.

Another aspect of the embodiments of the present application provides a rate matching method. The rate matching method in this embodiment is a further supplement of the foregoing embodiments, and same content may not be described in detail again. In the foregoing MIMO communications system, a sub-data flow allocated to a transmit end is sent on a spatial channel after undergoing processes such as channel coding, scrambling, modulation, MIMO layer mapping, and precoding. To improve signal quality and a signal coverage capability, rate matching may be performed during channel coding. A purpose of rate matching is to adapt a bit of a code block in channel coding to a bit quantity in a modulation phase in a repeated manner. A specific manner may include: fixedly storing, in a circular cache, bits obtained after channel coding is performed on a plurality of transport blocks of different sub-data flows of a same data flow. All transmit ends each notify a receive end of a different redundancy version (RV) number. The different RV numbers are used to determine positions of bits that are in circular caches of different transmit ends and that are obtained after channel coding is performed.

In the foregoing rate matching process, all the transmit ends may perform channel coding on allocated sub-data flows in a same manner or different manners, and different transmit ends use different RV numbers. Sub-data flows sent by different transmit ends are essentially from a same data flow. This is equivalent to that the receive end receives different transport blocks of the same data flow with different RV numbers. When the receive end performs hybrid automatic repeat request (HARQ) combining, quality and coverage of a signal can be improved.

The RV numbers of the different sub-data flows of the same data flow may be determined in the following manner:

$RV_{i,j}=\mod(RV_{1,j}+i,4)$, where $RV_{i,j}$ represents a $j^{th}$ RV number of a transmit end $T_i$, and $RV_{1,j}$ represents a $j^{th}$ RV number of a transmit end $T_1$ (a serving node of the receive end).

In an example, each of N transmit ends may use a different manner for performing rate matching. Each transmit end may select to send different code blocks on which channel coding is performed (a sending manner 1), or may select to send different RV numbers of a same code block (a sending manner 2). A sending manner selected by each transmit end may be determined based on a channel quality indicator (CQI) in channel state information of a downlink spatial channel. A transmit end with a CQI greater than a threshold 1 may send different code blocks, to obtain a multiplexing gain and improve a peak throughput. A transmit end with a CQI greater than a threshold 2 but less than a threshold 1 may send different RV numbers of a code block, to obtain a code diversity gain and improve signal coverage and receive quality. A transmit end with a CQI less than a threshold 2 is no longer allocated a to-be-sent sub-data flow.

To notify the receive end of a rate matching manner, in the foregoing embodiments, each transmit end may indicate the sending manner by using one bit in the downlink control information sent to the receive end, for example, 0 indicates the sending manner 1, and 1 indicates the sending manner 2. If two transmit ends use a same sending manner, fields for indicating a sending manner in downlink control information that is of the two transmit ends and received by the receive end are the same. In this case, the receive end may perform HARQ combining based on different RV numbers.

An aspect of the embodiments of the present application provides a data interleaving method. The data interleaving method in this embodiment is a further supplement of the foregoing embodiments, and same content may not be described in detail again. In the foregoing MIMO communications system, a sub-data flow allocated to a transmit end is sent on a spatial channel after undergoing processes such as channel coding, scrambling, modulation, MIMO layer mapping, and precoding. However, the spatial channel may still cause short-time strong interference to contiguous data in the sent data flow. The interference may be randomized by using data interleaving, so that the interference is scattered.

Data interleaving performed on a codeword before MIMO layer mapping is referred to as codeword interleaving. Data interleaving performed on MIMO layer data after MIMO layer mapping is referred to as MIMO layer interleaving. Both the codeword interleaving and the MIMO layer interleaving are essentially exchange of different segments of data. An interleaving size indicates a size of a segment of data to be exchanged to another codeword. Each transmit end independently performs data interleaving. Therefore, each transmit end may individually determine whether to perform codeword interleaving or MIMO layer interleaving, determine an interleaving size when performing data interleaving, and notify a receive end of the interleaving size by using the downlink control information mentioned in the foregoing embodiments, so that the receive end performs de-interleaving.

Each transmit end performs data interleaving independently and exerts no impact on other transmit ends. Without loss of generality, in this embodiment, a transmit end $T_i$ is used as an example, and $C_i$ codewords are generated after channel coding is performed on a sub-data flow i allocated to the transmit end $T_i$. The transmit end $T_i$ may perform interleaving on the $C_i$ codewords before MIMO layer mapping is performed, or may perform interleaving on the $C_i$ codewords after $L_i$ layers of MIMO layer data are generated after MIMO layer mapping.

Figure 8:
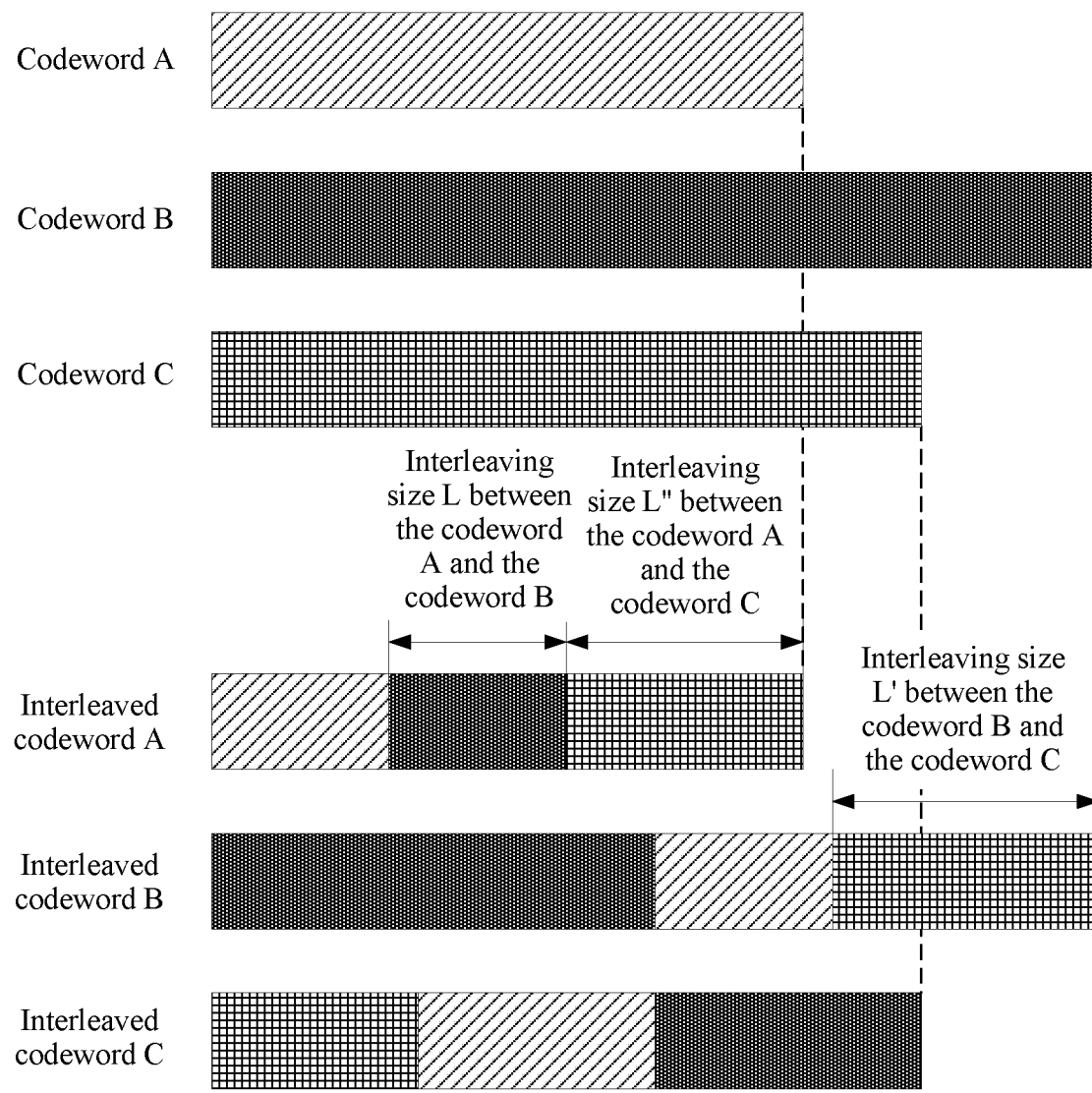
FIG. 8 is a schematic diagram of codeword interleaving according to an embodiment of the present application.

That the data interleaving is codeword interleaving is used as an example. FIG. 8 is a schematic diagram of codeword interleaving. An interleaving size between a codeword A and a codeword B is L, an interleaving size between the codeword B and a codeword C is L', and an interleaving size between the codeword A and the codeword C is L". In this case, the codeword A includes data that is of the codeword B and whose size is L and data that is of the codeword C and whose size is L", the codeword B includes data that is of the codeword A and whose size is L and data that is of the codeword C and whose size is L', and the codeword C includes data that is of the codeword A and whose size is L" and data that is of the codeword B and whose size is L'. In this interleaving manner, an interleaving size from the codeword A to the codeword B is the same as an interleaving size from the codeword B to the codeword A, an interleaving size from the codeword A to the codeword C is the same as an interleaving size from the codeword C to the codeword A, an interleaving size from the codeword B to the codeword C is the same as an interleaving size from the codeword C to the codeword B. Therefore, after the interleaving, a size of an interleaved codeword A is the same as a size of the codeword A that is not interleaved, a size of an interleaved codeword B is the same as a size of the codeword B that is not interleaved, and a size of an interleaved codeword C is the same as a size of the codeword C that is not interleaved.

Figure 9:
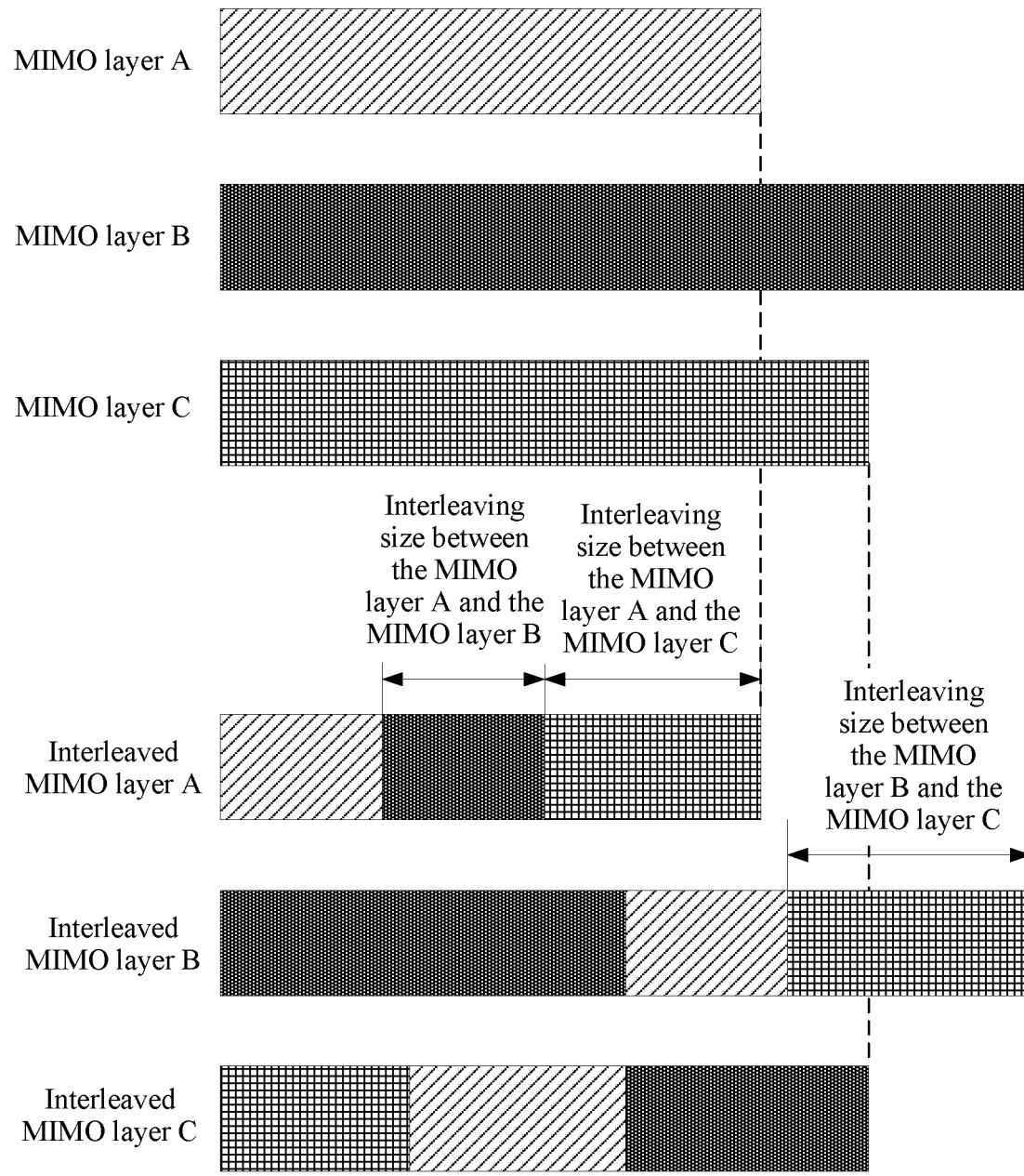
FIG. 9 is a schematic diagram of MIMO layer data interleaving according to an embodiment of the present application.

Likewise, if the data interleaving is MIMO layer interleaving, a schematic diagram of MIMO layer interleaving shown in FIG. 9 may be obtained.

Further, during the data interleaving, sizes of different segments of data to be interleaved may be changed by performing scaling on the different data segments to be interleaved; however, a sum of the sizes of the different segments of data keeps unchanged.

Figure 10:
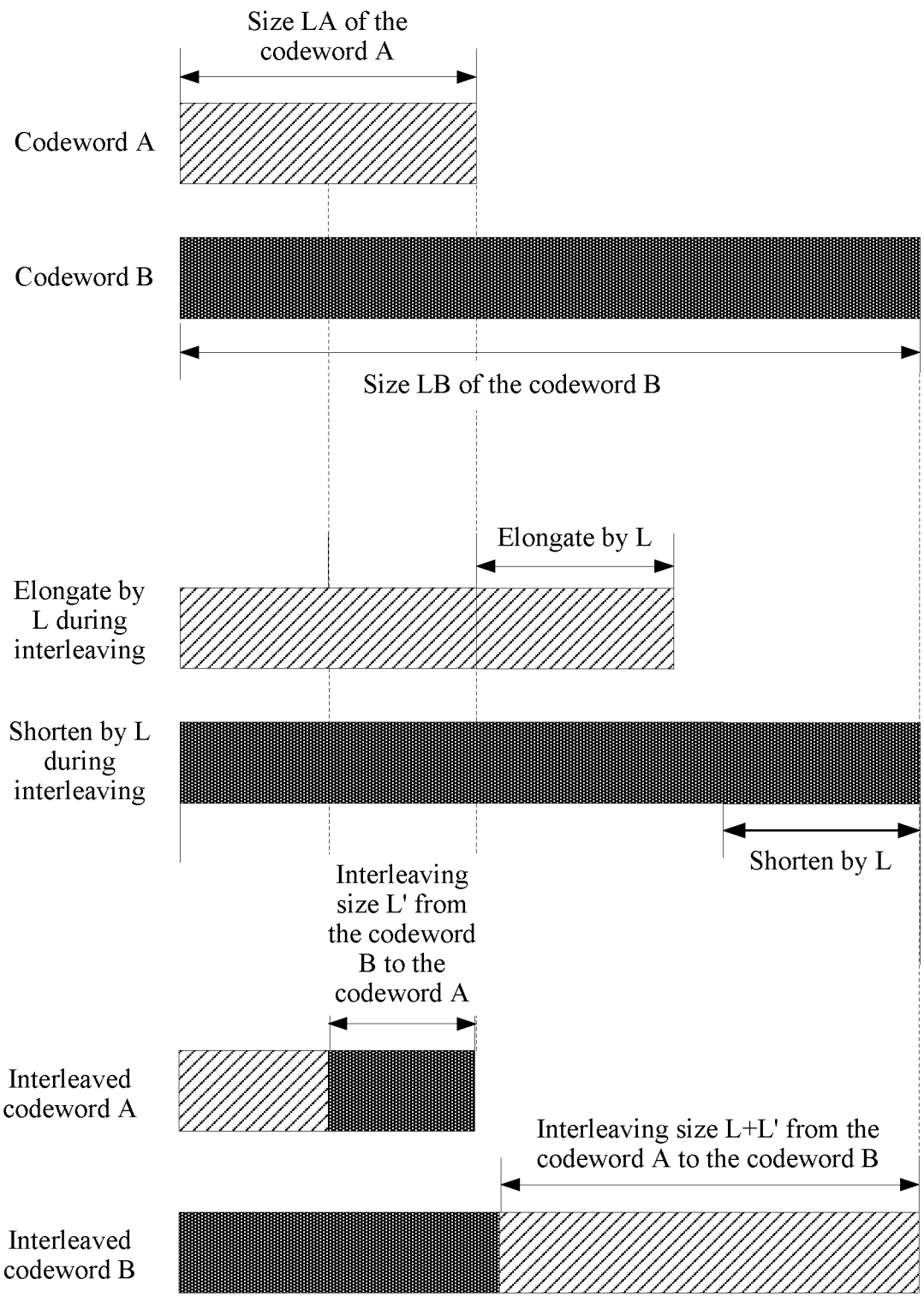
FIG. 10 is a schematic diagram of codeword interleaving according to an embodiment of the present application.

That the data interleaving is codeword interleaving is used as an example. FIG. 10 is a schematic diagram of codeword interleaving. A size of a codeword A is LA, and a size of a codeword B is LB. Currently, the size of the codeword A is increased to (LA+L). To ensure that a sum of the size of the codeword A and the size of the codeword B keeps unchanged, the size of the codeword B is decreased to (LB−L). In this case, interleaving performed on the codeword A and the codeword B is exchanging data of the codeword A with a size (LA+L) for data of the codeword B with a size (LB−L). In addition, to ensure that an elongated or shortened codeword keeps a same size as an original codeword after exchange, the elongated codeword A is interleaved with the shorten codeword B by data with a size (L+L'), and the shortened codeword B is interleaved with the elongated codeword A by data with a size L'. Finally, after the interleaving, the size of the codeword A is LA, and the size of the codeword B is LB. A sum of the size of the codeword A and the size of the codeword B is still (LA+LB) after the interleaving.

Whether to perform scaling on the different data segments may be determined by each transmit end that sends a sub-data flow, and indicated to the receive end by using the foregoing downlink control information.

Figure 11:
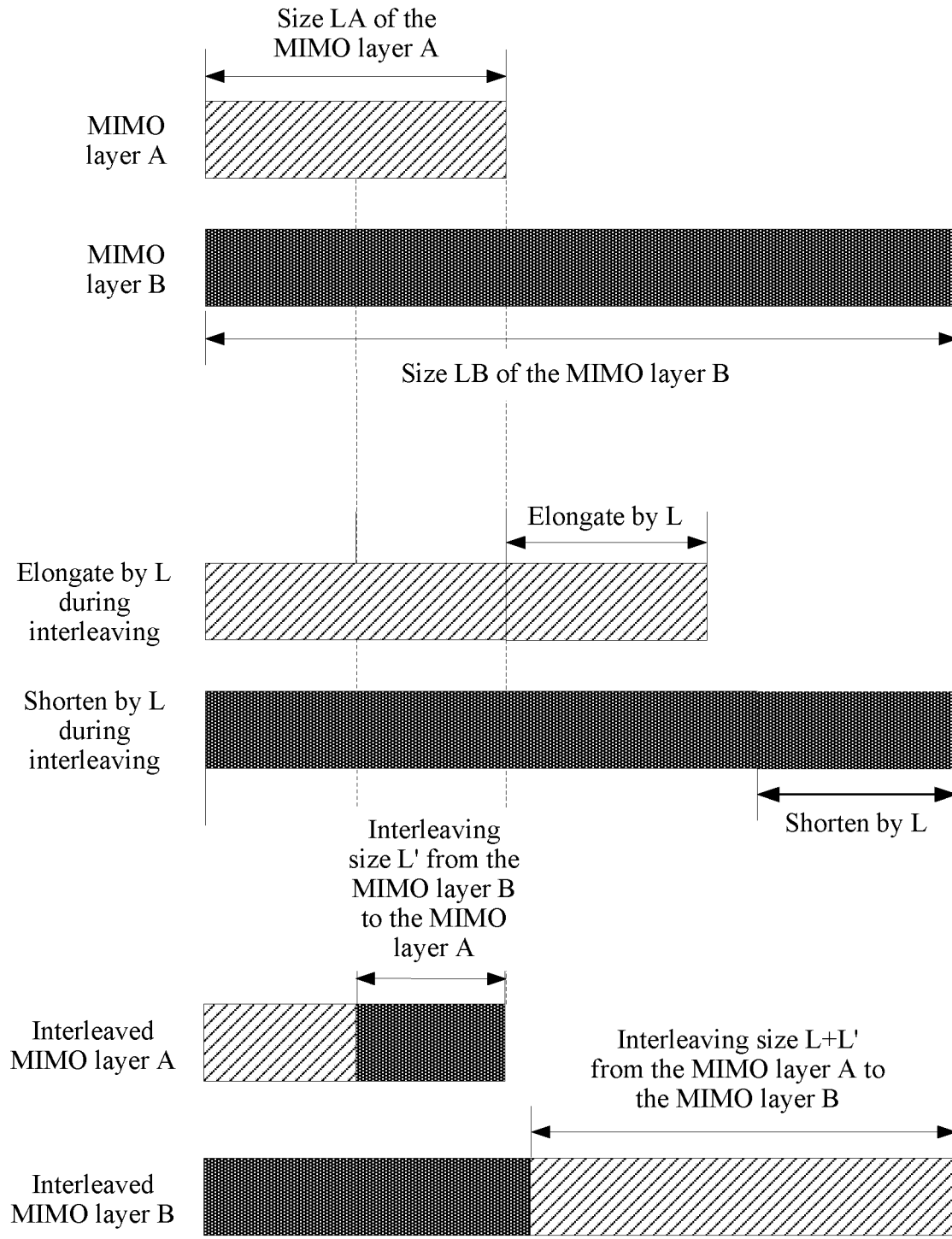
FIG. 11 is a schematic diagram of MIMO layer data interleaving according to an embodiment of the present application.

Likewise, if the data interleaving is MIMO layer interleaving, a schematic diagram of MIMO layer interleaving shown in FIG. 11 may be obtained.

By applying the data interleaving method provided in this embodiment of the present application, during transmission, a segment of data is included in another segment of data for transmission, so that the segment of data can be retransmitted, thereby improving a data diversity gain, and further improving spectral efficiency. In addition, possible interference is scattered by performing data interleaving, thereby improving communication quality.

Figure 12:
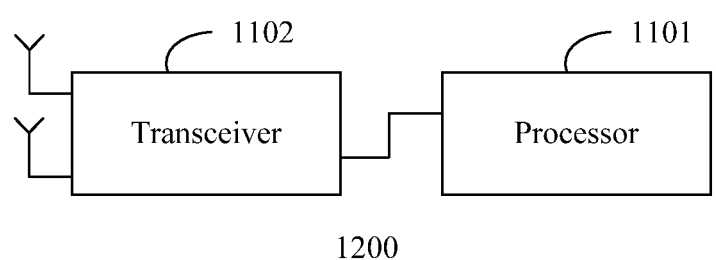
FIG. 12 is a schematic structural diagram of a transmission control device according to an embodiment of the present application.

An embodiment of the present application provides a transmission control device 1200. FIG. 12 is a schematic structural diagram of the transmission control device 1200. The transmission control device 1200 includes a processor 1201 and a transceiver 1202. The transmission control device 1200 provided in this embodiment of the present application may be configured to perform an operation of the transmission control device in the foregoing method embodiments.

The processor 1201 is configured to: divide one data flow into N sub-data flows, and allocate the N sub-data flows to N transmit ends, where N is an integer greater than 1.

The transceiver 1202 is configured to instruct each of the N transmit ends to send an allocated sub-data flow to a same receive end on a same time-frequency resource.

In one embodiment, the transceiver 1202 is further configured to: notify each transmit end of a quantity of MIMO layers of a codeword when each transmit end sends the allocated sub-data flow and a modulation and coding scheme of the codeword when each transmit end sends the allocated sub-data flow, where a sum of quantities of MIMO layers of codewords when all transmit ends send allocated sub-data flows is not greater than a quantity of receive antennas of the receive end.

In one embodiment, in a time division multiplexing system, the processor 1201 is further configured to: determine a channel matrix of each downlink spatial channel based on measurement performed by each transmit end on an uplink spatial channel, and perform orthogonalization on the channel matrix of each downlink spatial channel, to obtain an optimal precoding matrix of a downlink spatial channel from the receive end to each transmit end; and the transceiver 1202 is further configured to separately notify each transmit end and the receive end of the optimal precoding matrix of each downlink spatial channel, so that the receive end uses the optimal precoding matrix as a precoding matrix actually used when each transmit end sends the allocated sub-data flow. For an orthogonalization method, specifically refer to the foregoing embodiment.

In one embodiment, in a frequency division multiplexing system, the transceiver 1202 is further configured to notify a serial number of each transmit end. The serial number of each transmit end is obtained by the receive end from downlink control information received from each transmit end, to determine MIMO layer data.

In an implementation, the transmission control device 1200 is one of the N transmit ends, and the processor 1201 is further configured to generate at least one codeword from a sub-data flow of the N sub-data flows that is allocated to the transmission control device.

The transceiver 1202 is configured to: after performing scrambling, modulation, MIMO layer mapping, precoding, physical resource mapping, and orthogonal frequency division multiplexing (OFDM) symbol generation on the at least one codeword on a physical layer based on downlink control information of the transmission control device, send, to the receive end on the same time-frequency resource, the sub-data flow of the N sub-data flows that is allocated to the transmission control device.

Figure 13:
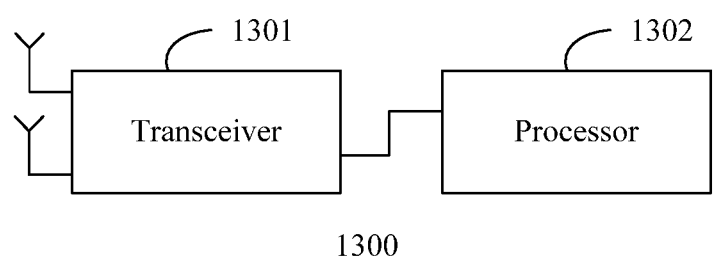
FIG. 13 is a schematic structural diagram of a receive end according to an embodiment of the present application.

An aspect of the embodiments of the present application provides a receive end 1300. FIG. 13 is a schematic structural diagram of the receive end. The receive end 1300 provided in this embodiment of the present application may perform an operation of the receive end in the foregoing method embodiments.

The receive end 1300 includes a transceiver 1301 and a processor 1302.

The processor 1302 is configured to obtain an optimal precoding matrix of a spatial channel between each of N transmit ends and the receive end, where the optimal precoding matrix is determined by performing orthogonalization on the spatial channel. For a specific orthogonalization method, refer to the foregoing embodiment.

The transceiver 1301 is configured to notify each transmit end of the optimal precoding matrix.

Each optimal precoding matrix determined by the receive end may be used as a reference of a precoding matrix actually used when each transmit end sends an allocated sub-data flow. For example, without loss of generality, a transmit end $T_i$ may use an optimal precoding matrix of a downlink spatial channel of the transmit end $T_i$ as a precoding matrix used for sending an allocated sub-data flow, where the optimal precoding matrix is determined by the receive end, or may determine a different precoding matrix based on the optimal precoding matrix and use the different precoding matrix as a precoding matrix used for sending an allocated sub-data flow. Alternatively, each transmit end may notify a transmission control device of a precoding matrix determined by the receive end, and the transmission control device determines a precoding matrix when each transmit end sends an allocated sub-data flow. The receive end may determine, by receiving downlink control information of each transmit end, the precoding matrix actually used when each transmit end sends the allocated sub-data flow.

In one embodiment, in a frequency division multiplexing system, the transceiver 1301 is configured to send first indication information to one of the N transmit ends. The first indication information includes at least one of the following: a quantity of MIMO layers of a codeword when the transmit end sends an allocated sub-data flow, and a reference modulation and coding scheme of the codeword when the transmit end sends the allocated sub-data flow. A sum of the quantity of MIMO layers when the transmit end sends the allocated sub-data flow and quantities of MIMO layers of codewords when other (N−1) transmit ends send allocated sub-data flows is not greater than a quantity of receive antennas of the receive end.

In one embodiment, the transceiver 1301 is further configured to receive the downlink control information of each transmit end. The downlink control information includes at least one of the following: a serial number of the transmit end in the N transmit ends, a quantity of codewords and a modulation and coding scheme of each codeword when the transmit end sends an allocated sub-data flow, a quantity of MIMO layers and a correspondence between a MIMO layer and a codeword when the transmit end sends the allocated sub-data flow, a correspondence between a MIMO layer and a logical antenna port when the transmit end sends the allocated sub-data flow, and a precoding matrix indication when the transmit end sends the allocated sub-data flow. Correspondingly, the processor 1302 is configured to: process a downlink signal from each transmit end based on the downlink control information of each transmit end, to obtain the sub-data flow allocated to each receive end.

The downlink control information of each transmit end is carried in only a control channel from one of the N transmit ends to the receive end; or the downlink control information of each transmit end is carried in a control channel from the transmit end to the receive end.

The transceiver is further configured to send second indication information to the transmission control device, where the second indication information indicates whether the sub-data flow sent by each transmit end is correctly received.

By applying the transmission control device 1200, the receive end 1300, and at least two transmit ends that are mentioned in the embodiments shown in FIG. 12 and FIG. 13, the transmission control device divides one data flow into a plurality of sub-data flows, allocates the sub-data flows to a plurality of transmit ends, instructs each transmit end to send the allocated sub-data flow on the same time-frequency resource, and notifies each transmit end of the quantity of MIMO layers when each transmit end sends the allocated sub-data flow. The transmission control device performs control in a unified manner, and each transmit end no longer needs to perform direct signaling interworking for coordination, thereby lowering a timing synchronization requirement for each transmit end, and reducing implementation complexity of a MIMO communications system. In addition, more transmit ends actually participate in sending the same data flow, improving transmission quality of the data flow.

Figure 3:
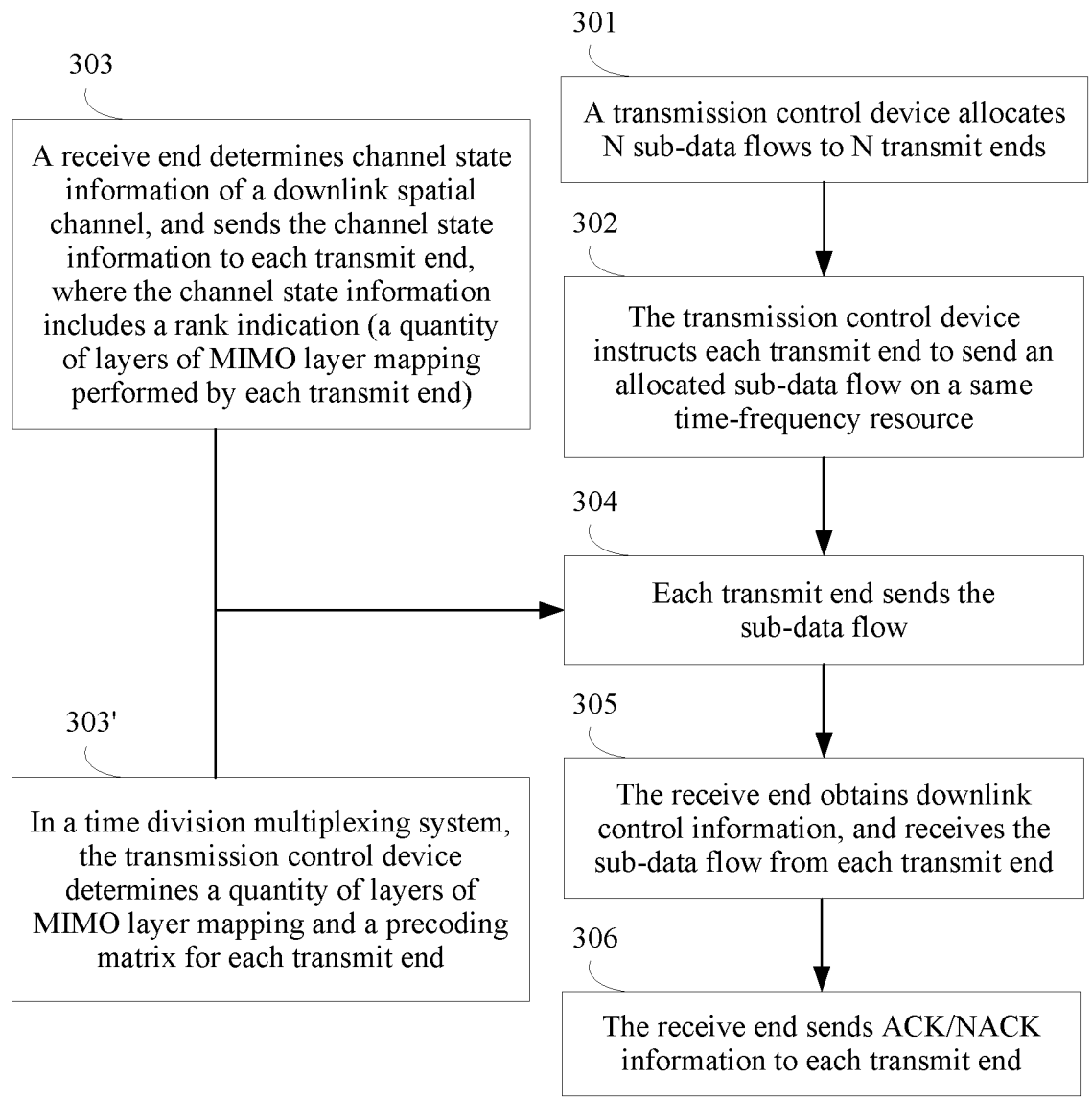
FIG. 3 is a schematic flowchart of a data processing method according to an embodiment of the present application.
Figure 4:
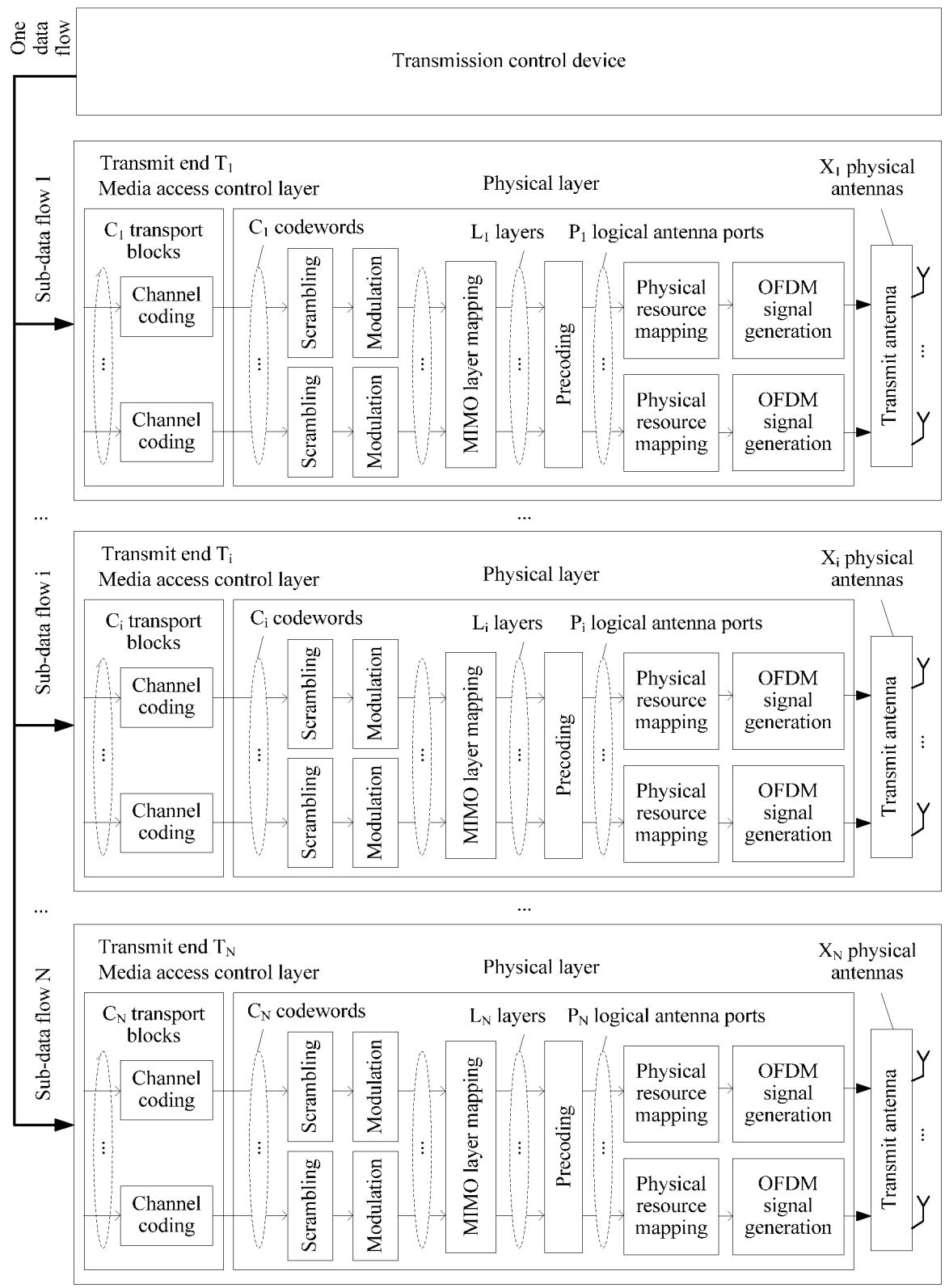
FIG. 4 is a schematic diagram of internal logic processing in another MIMO wireless communications system according to an embodiment of the present application.
Figure 14A:
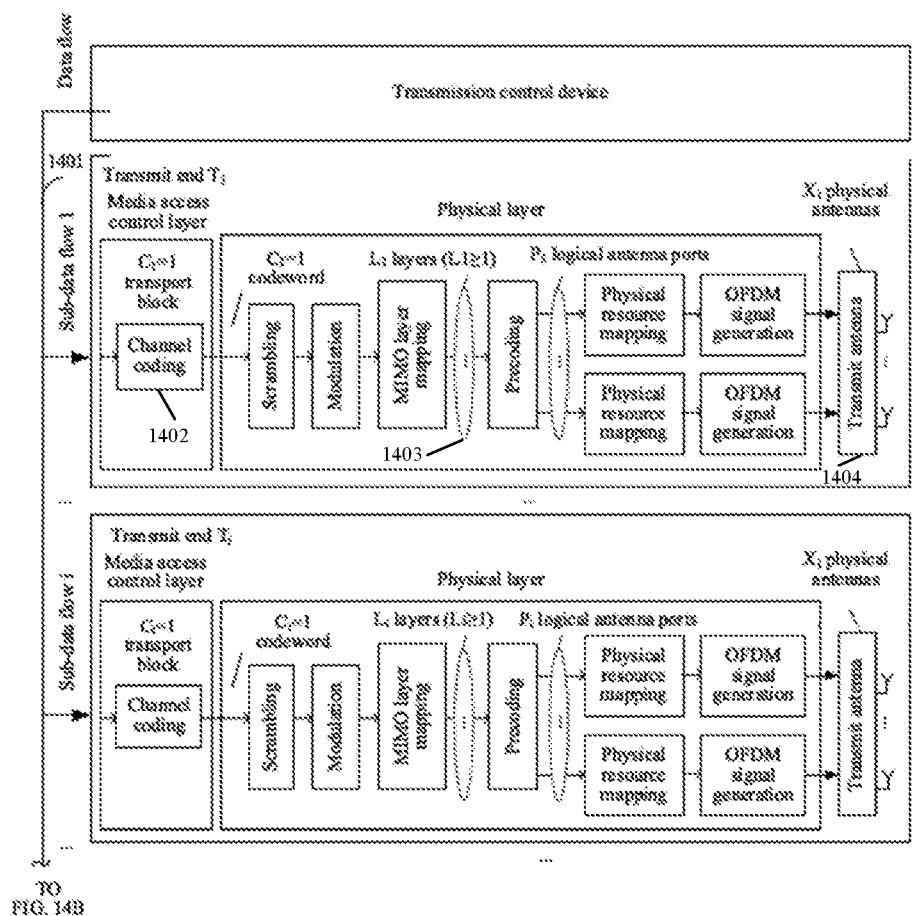
FIG. 14A and FIG. 14B are a schematic flowchart of a data processing method according to an embodiment of the present application.
Figure 14B:
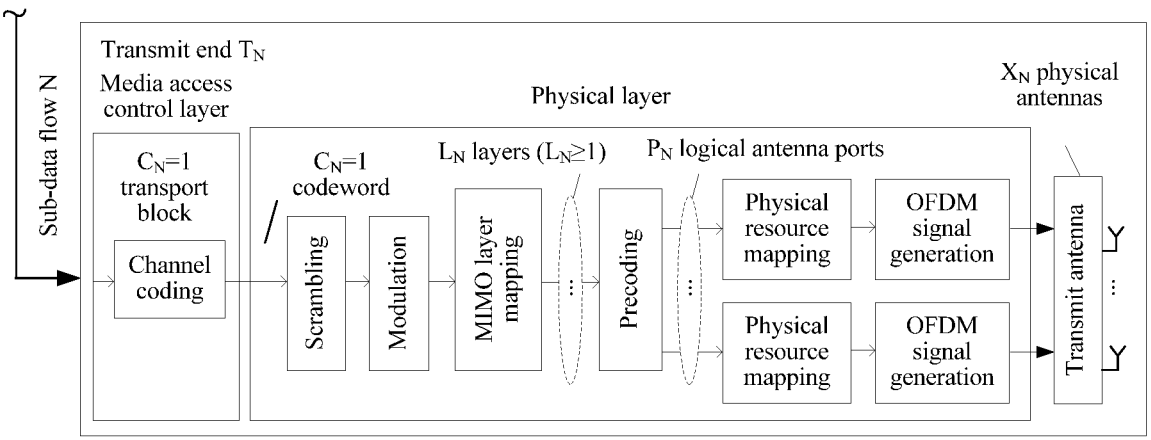
Figure 14B:
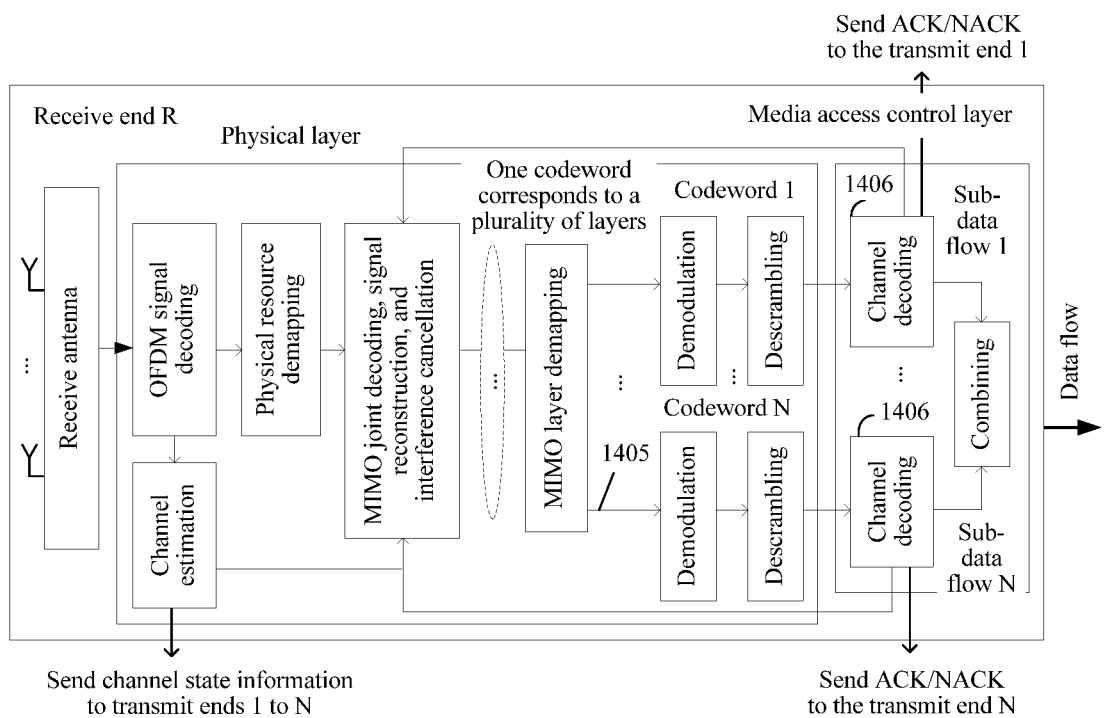

Another aspect of the embodiments of the present application provides a data processing method, applied to a schematic diagram of internal logic processing in a MIMO communications system shown in FIG. 14A and FIG. 14B. In a schematic data processing flowchart shown in FIG. 14A and FIG. 14B, the data processing method in the embodiments corresponding to FIG. 3 and FIG. 4 is further described, and same content may not be described in detail again.

In a data processing process shown in FIG. 14A and FIG. 14B, for example, a total quantity of transmit ends is N, and after performing channel coding on an allocated sub-data flow, each transmit end generates only one codeword ($C_1, \ldots, C_i, \ldots,$ and $C_N$ are all 1). A quantity ($L_1, \ldots, L_i, \ldots,$ and $L_N$) of layers of MIMO layer mapping is greater than or equal to 1. A quantity of layers of MIMO layer mapping that is performed by each of the transmit ends $T_1, \ldots, T_i, \ldots,$ and $T_N$ on the only one generated codeword may be notified by a transmission control device or determined by each transmit end by referring to a quantity of layers of MIMO layer mapping that is determined by a receive end. The data processing process shown in FIG. 14A and FIG. 14B includes the following content.

1401. The transmission control device divides one data flow into N sub-data flows, and allocates the N sub-data flows to the N transmit ends (the transmit ends $T_1, \ldots, T_i, \ldots,$ and $T_N$).

The transmission control device may be one of the N transmit ends, a core network device, or a network management system. The transmission control device delivers a data flow 1401 to the N transmit ends in a unified manner. The data flow 1401 includes the following operations.

In operation 1402. The N transmit ends each perform channel coding on the allocated sub-data flows, and each transmit end generates only one codeword.

In the operation, the transmit end $T_1$ generates a codeword 1, a transmit end $T_2$ generates a codeword 2, a transmit end $T_3$ generates only a codeword 3, and so on.

In operation 1403 after the N transmit ends each perform scrambling, modulation mapping, and MIMO layer mapping on the generated codewords, each transmit end generates at least one layer of MIMO layer data.

In the operation, without loss of generality, the transmit end $T_i$ is used as an example. The transmit end $T_i$ receives a quantity of layers of MIMO layer mapping that is notified by the transmission control device, and the transmit end uses the quantity of layers of MIMO layer mapping that is notified by the transmission control device as a quantity of layers of MIMO layer mapping performed by the transmit end. In this case, the transmit end $T_i$ uses the quantity of layers of MIMO layer mapping that is notified by the transmission control device to generate MIMO layer data. Alternatively, the transmit end $T_i$ may receive a quantity of layers of MIMO layer mapping that is determined by the receive end for the transmit end $T_i$, and the transmit end $T_i$ determines a quantity of layers of MIMO layer mapping performed by the transmit end $T_i$, based on the quantity of layers of MIMO layer mapping that is determined by the receive end for the transmit end. In this case, the transmit end $T_i$ determines, by referring to the quantity of layers of MIMO layer mapping that is determined by the receive end for the transmit end $T_i$, the quantity of layers of MIMO layer mapping performed by the transmit end $T_i$. The quantity of layers of MIMO layer mapping performed by the transmit end $T_i$ may be the quantity of layers of MIMO layer mapping that is determined by the receive end for the transmit end $T_i$, or may be different from the quantity of layers of MIMO layer mapping that is determined by the receive end. For details, refer to the foregoing method embodiments, for example, operation 303 and operation 303'.

In operation 1404, after performing precoding, physical resource mapping, and OFDM symbol generation on the layer of generated MIMO layer data, the two transmit ends each send the layer of MIMO layer data on a same time-frequency resource by using at least one physical antenna.

In the operation, the receive end may perform channel measurement and channel estimation on a downlink spatial channel from each of the N transmit ends to the receive end, to determine channel state information of the downlink spatial channel, and separately send the channel state information to the N transmit ends.

In operation 1405, the receive end receives downlink OFDM signals from the two transmit ends, and performs OFDM signal decoding, at least one layer of MIMO layer demapping corresponding to one codeword, and channel decoding for the one codeword.

In operation 1406, the receive end determines, by separately performing the channel decoding on one codeword of the N transmit ends, whether the sub-data flows sent by the two transmit ends are correctly received.

For any one of the N transmit ends, the receive end may determine, in an error correction and checking manner, whether a sub-data flow of the transmit end is correctly received. If the receive end correctly receives the sub-data flow of the transmit end, the receive end sends an acknowledgement (ACK) to the transmit end. If the receive end does not correctly receive the sub-data flow sent by the transmit end, the receive end sends a negative acknowledgement (NACK) to the transmit end, so that the transmit end retransmits the sub-data flow.

If the receive end correctly receives all the sub-data flows sent by the N transmit ends, the receive end combines the N sub-data flows, to obtain the entire data flow.

In this embodiment, each transmit end generates one codeword, and a quantity of MIMO layers is greater than or equal to 1.

Figure 15:
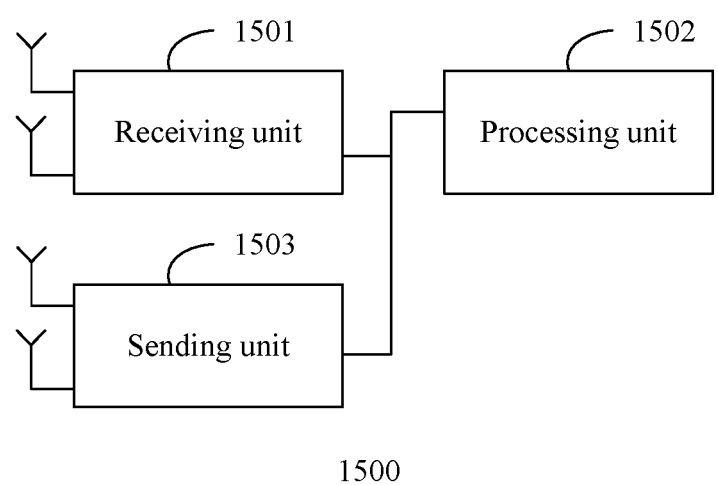
FIG. 15 is a schematic structural diagram of a transmit end according to an embodiment of the present application.

Based on FIG. 14A and FIG. 14B, an embodiment of the present application further provides a schematic structural diagram of a transmit end 1500 shown in FIG. 15 and configured to perform the method shown in FIG. 5 or FIG. 14A and FIG. 14B.

The transmit end 1500 includes:
a receiving unit 1501, configured to receive a sub-data flow i of N sub-data flows that are divided from a data flow and that are allocated to N transmit ends, where the transmit end $T_i$ is any one of the N transmit ends;
a processing unit 1502, configured to: generate $C_i$ codewords from the sub-data flow i, and perform $L_i$ layers of MIMO layer mapping on the $C_i$ codewords; and
a sending unit 1503, configured to send the sub-data flow i to a receive end after the MIMO layer mapping.

In one embodiment, the transmit end $T_i$ and other transmit ends of the N transmit ends generate a same quantity of codewords, that is, one codeword; and a quantity of layers of MIMO layer mapping performed by the transmit end is greater than or equal to 1.

In one embodiment, the transmit end $T_i$ and other transmit ends of the N transmit ends generate a same quantity of codewords, that is, one codeword; and a quantity of layers of MIMO layer mapping performed by the transmit end is the same as quantities of layers of MIMO layer mapping performed by the other transmit ends of the N transmit ends, and all the quantities are 1.

It should be noted that, during implementation, the sending unit may be a transmitter, the processing unit may be a processor, and the receiving unit may be a receiver. The sending unit may perform a sending operation of the transmit end in the embodiment shown in FIG. 5 or FIG. 14A and FIG. 14B, the processing unit is configured to perform processing operations such as generation, coding, and mapping of the transmit end in the embodiment shown in FIG. 5 or FIG. 14A and FIG. 14B, and the receiving unit is configured to perform a receiving operation of the transmit end in the embodiment shown in FIG. 5 or FIG. 14A and FIG. 14B.

By applying the transmit end provided in this embodiment, the beneficial effects of the foregoing embodiments are provided, and implementation of an existing system architecture can be simpler.

A person of ordinary skill in the art may understand that all or some of processes of the methods in the embodiments may be implemented by a computer program instructing relevant hardware. The program may be stored in a computer-readable storage medium. When the program runs, the processes of the method embodiments may be included. The foregoing storage medium includes any medium that can store program code, such as a ROM, a RAM, a magnetic disk, or an optical disc.

The foregoing embodiments are merely example embodiments of the present application, and certainly are not intended to limit the scope of the claims of the present application. A person of ordinary skill in the art may understand that all or some of the processes that implement the foregoing embodiments and equivalent modifications made in accordance with the claims of the present application shall fall within the scope of the present application.

What is claimed is:

1. A data processing method, comprising:
determining, by a receive end, a channel matrix $$\begin{pmatrix} H_1 & & & & \\ & O & & & \\ & & H_i & & \\ & & & O & \\ & & & & H_N \end{pmatrix}$$

of a downlink spatial channel from each of N transmit ends $(T_1, \ldots, T_i, \ldots, $ and $T_N)$ to the receive end;
determining, by the receive end, a combination $$\begin{pmatrix} W_1 & & & & \\ & O & & & \\ & & W_i & & \\ & & & O & \\ & & & & W_N \end{pmatrix}$$

of a precoding matrix of each transmit end from a precoding matrix codebook of the transmit end using a reference signal sent by the transmit end, wherein i is an integer greater than or equal to 1 and less than or equal to N, $W_i$ is a precoding matrix of a transmit end $T_i$, and $$\begin{pmatrix} H_1 & & & & \\ & O & & & \\ & & H_i & & \\ & & & O & \\ & & & & H_N \end{pmatrix} \times \begin{pmatrix} W_1 & & & & \\ & O & & & \\ & & W_i & & \\ & & & O & \\ & & & & W_N \end{pmatrix}$$

satisfies an orthogonalization criterion; and
notifying, by the receive end, the transmit end of the precoding matrix of the transmit end.

2. The method according to claim 1, wherein the method further comprises:
sending, by the receive end, first indication information to one of the N transmit ends, wherein the first indication information comprises at least one of the following: a quantity of MIMO layers of a codeword when the transmit end sends an allocated sub-data flow, and a reference modulation and coding scheme of the codeword when the transmit end sends the allocated sub-data flow, and a sum of the quantity of MIMO layers of the codeword of the transmit end and quantities of MIMO layers of codewords when other (N−1) transmit ends send allocated sub-data flows is not greater than a quantity of receive antennas of the receive end.

3. The method according to claim 1, wherein the method further comprises:
   receiving, by the receive end, downlink control information of the transmit end;
   processing, by the receive end, a downlink signal from the transmit end based on the downlink control information of the transmit end, to obtain a sub-data flow allocated to the transmit end, wherein
   the sub-data flow allocated to the transmit end is obtained after a transmission control device divides one data flow into N sub-data flows.

4. The method according to claim 3, wherein the downlink control information of the transmit end is carried in a control channel from only one of the N transmit ends to the receive end or in a control channel from each of the transmit ends to the receive end.

5. The method according to claim 3, wherein the method further comprises:
   sending, by the receive end, second indication information to the transmit end, wherein the second indication information indicates whether the sub-data flow sent by the transmit end is correctly received.

6. A receive end, comprising a processor and a transceiver, wherein
   wherein the processor is configured to determine a channel matrix $$\begin{pmatrix} H_1 & & & & \\ & O & & & \\ & & H_i & & \\ & & & O & \\ & & & & H_N \end{pmatrix}$$

of a downlink spatial channel from each of N transmit ends $(T_1, \ldots, T_i, \ldots, \text{and } T_N)$ to the receive end;
   wherein the processor is further configured to determine a combination $$\begin{pmatrix} W_1 & & & & \\ & O & & & \\ & & W_i & & \\ & & & O & \\ & & & & W_N \end{pmatrix}$$

of a precoding matrix of each transmit end from a precoding matrix codebook of the transmit end using a reference signal sent by the transmit end, wherein i is an integer greater than or equal to 1 and less than or equal to N, $W_i$ is an optimal precoding matrix of a transmit end $T_i$, and $$\begin{pmatrix} H_1 & & & & \\ & O & & & \\ & & H_i & & \\ & & & O & \\ & & & & H_N \end{pmatrix} \times \begin{pmatrix} W_1 & & & & \\ & O & & & \\ & & W_i & & \\ & & & O & \\ & & & & W_N \end{pmatrix}$$

satisfies an orthogonalization criterion; and
   wherein the transceiver is further configured to notify the transmit end of the precoding matrix of the transmit end.

7. The receive end according to claim 6, wherein in a frequency division multiplexing system,
   the transceiver is configured to send first indication information to each of the N transmit ends, wherein the first indication information comprises at least one of the following: a quantity of multiple input multiple output (MIMO) layers of a codeword when the transmit end sends an allocated sub-data flow, and a reference modulation and coding scheme of the codeword when the transmit end sends the allocated sub-data flow, and a sum of quantities of MIMO layers when the (N−1) transmit ends send allocated sub-data flows is not greater than a quantity of receive antennas of the receive end.

8. The receive end according to claim 6,
   wherein the transceiver is further configured to receive downlink control information of the transmit end;
   wherein the receive end processes a downlink signal from the transmit end based on the downlink control information of the transmit end, to obtain a sub-data flow allocated to the transmit end, and
   wherein the sub-data flow allocated to the transmit end is obtained after a transmission control device divides one data flow into N sub-data flows.

9. The receive end according to claim 8,
   wherein the downlink control information of the transmit end is carried in a control channel from only one of the N transmit ends to the receive end or in a control channel from each of the transmit ends to the receive end.

10. The receive end according to claim 8,
    wherein the transceiver is further configured to send second indication information to the transmit end, wherein the second indication information indicates whether the sub-data flow sent by the transmit end is correctly received.

11. A transmit end, comprising: a receiver, a processor and a transmitter;
    wherein the receiver is configured to receive a sub-data flow i of N sub-data flows that are divided from a data flow by a transmission control device and that are allocated to each of N transmit ends by the transmission control device, wherein the transmit end $T_i$ is any one of the N transmit ends, wherein the transmission control device instructs the N transmit ends to send the N sub-data flows in a same time-frequency resource;
    wherein the processor is configured to: generate $C_i$ codewords from the sub-data flow i, and perform $L_i$ layers of MIMO layer mapping on the $C_i$ codewords; and
    wherein the transmitter is configured to send each of the N sub-data flows on a same time-frequency resource to a receive end after the MIMO layer mapping.

12. The transmit end according to claim 11,
    wherein the transmit end $T_i$ and one or more other transmit ends of the N transmit ends generate a same quantity of codewords, the same quantity of codewords being one codeword; and
    wherein a quantity of layers of MIMO layer mapping performed by the transmit end $T_i$ is greater than or equal to 1.

13. The transmit end according to claim 12,
    wherein the receiver is further configured to receive, from a user equipment, a quantity of layers of MIMO layer mapping that is determined by the user equipment for the transmit end; and
    wherein the processor is further configured to determine, based on the quantity of layers of MIMO layer mapping that is determined by the user equipment for the transmit end, the quantity of layers of MIMO layer mapping performed by the transmit end.

14. The transmit end according to claim 12,
wherein the receiver is further configured to receive a quantity of layers of MIMO layer mapping that is determined by a transmission control device for the transmit end; and
wherein the processor is further configured to use the quantity of layers of MIMO layer mapping that is determined by the transmission control device for the transmit end, the quantity of layers of MIMO layer mapping performed by the transmit end.

15. The transmit end according to claim 12,
wherein the transmit end $T_i$ and one or more other transmit ends of the N transmit ends generate a same quantity of codewords, the same quantity of codewords being one codeword; and
wherein the quantity of layers of MIMO layer mapping performed by the transmit end $T_i$ is the same as a quantity of layers of MIMO layer mapping performed by each of the other transmit ends of the N transmit ends, and wherein each of the quantities is 1.

* * * * *

UNITED STATES PATENT AND TRADEMARK OFFICE
CERTIFICATE OF CORRECTION

PATENT NO. : 10,879,968 B2  
APPLICATION NO. : 16/264317  
DATED : December 29, 2020  
INVENTOR(S) : Pengpeng Dong and Weiming Duan Page 1 of 5

It is certified that error appears in the above-identified patent and that said Letters Patent is hereby corrected as shown below:

In the Specification

In Column 2, Line 5-13, delete "$\begin{pmatrix} H_1 & & & O \\ & \ddots & & \\ & & H_i & \\ & & & \ddots \\ O & & & & H_N \end{pmatrix}$" and insert -- $\begin{pmatrix} H_1 & & & \\ & \ddots & & \\ & & H_i & \\ & & & \ddots \\ & & & & H_N \end{pmatrix}$ --.

In Column 2, Line 17-25, delete "$\begin{pmatrix} W_1 & & & O \\ & \ddots & & \\ & & W_i & \\ & & & \ddots \\ O & & & & W_N \end{pmatrix}$" and insert -- $\begin{pmatrix} W_1 & & & \\ & \ddots & & \\ & & W_i & \\ & & & \ddots \\ & & & & W_N \end{pmatrix}$ --.

In Column 2, Line 31-39, delete "$\begin{pmatrix} H_1 & & & O \\ & \ddots & & \\ & & H_i & \\ & & & \ddots \\ O & & & & H_N \end{pmatrix} \times \begin{pmatrix} W_1 & & & O \\ & \ddots & & \\ & & W_i & \\ & & & \ddots \\ O & & & & W_N \end{pmatrix}$" and insert -- $\begin{pmatrix} H_1 & & & \\ & \ddots & & \\ & & H_i & \\ & & & \ddots \\ & & & & H_N \end{pmatrix} \times \begin{pmatrix} W_1 & & & \\ & \ddots & & \\ & & W_i & \\ & & & \ddots \\ & & & & W_N \end{pmatrix}$ --.

Signed and Sealed this  
Twenty-sixth Day of April, 2022

*Katherine Kelly Vidal*

Katherine Kelly Vidal  
*Director of the United States Patent and Trademark Office*

CERTIFICATE OF CORRECTION (continued)
U.S. Pat. No. 10,879,968 B2

In Column 4, Line 58-65, delete "$\begin{pmatrix} H_1 & & & & o \\ & \ddots & & & \\ & & H_i & & \\ & & & \ddots & \\ o & & & & H_N \end{pmatrix}$" and insert --$\begin{pmatrix} H_1 & & & & \\ & \ddots & & & \\ & & H_i & & \\ & & & \ddots & \\ & & & & H_N \end{pmatrix}$--.

In Column 5, Line 7-15, delete "$\begin{pmatrix} W_1 & & & & o \\ & \ddots & & & \\ & & W_i & & \\ & & & \ddots & \\ o & & & & W_N \end{pmatrix}$" and insert --$\begin{pmatrix} W_1 & & & & \\ & \ddots & & & \\ & & W_i & & \\ & & & \ddots & \\ & & & & W_N \end{pmatrix}$--.

In Column 5, Line 21-29, delete "$\begin{pmatrix} H_1 & & & o \\ & \ddots & & \\ & & H_i & \\ & & & \ddots \\ o & & & H_N \end{pmatrix} \times \begin{pmatrix} W_1 & & & o \\ & \ddots & & \\ & & W_i & \\ & & & \ddots \\ o & & & W_N \end{pmatrix}$" and insert --$\begin{pmatrix} H_1 & & & \\ & \ddots & & \\ & & H_i & \\ & & & \ddots \\ & & & & H_N \end{pmatrix} \times \begin{pmatrix} W_1 & & & \\ & \ddots & & \\ & & W_i & \\ & & & \ddots \\ & & & & W_N \end{pmatrix}$--.

In Column 11, Line 18, delete "$0 \cdot m \leq Q^{layer}$" and insert -- $0 \leq m \leq Q^{layer}$ --.

In Column 11, Line 20-27, delete "$\begin{Bmatrix} y^{(0)}(m) \\ M \\ y^{(P_m-1)}(m) \end{Bmatrix} = W_m \cdot \begin{Bmatrix} x^{(0)}(m) \\ M \\ x^{(L_m-1)}(m) \end{Bmatrix}$" and insert --$\begin{Bmatrix} y^{(0)}(m) \\ \vdots \\ y^{(P_m-1)}(m) \end{Bmatrix} = W_m \cdot \begin{Bmatrix} x^{(0)}(m) \\ \vdots \\ x^{(L_m-1)}(m) \end{Bmatrix}$--.

CERTIFICATE OF CORRECTION (continued)
U.S. Pat. No. 10,879,968 B2

In Column 18, Line 13-21, delete "$\begin{pmatrix} W_1 & & & & \\ & \circ & & & \\ & & W_i & & \\ & & & \circ & \\ & & & & W_N \end{pmatrix}$" and insert -- $W = \begin{pmatrix} W_1 & & & & \\ & \ddots & & & \\ & & W_i & & \\ & & & \ddots & \\ & & & & W_N \end{pmatrix}$ --.

In Column 19, Line 27-35, delete "$H = \begin{bmatrix} H_1 \\ M \\ H_i \\ M \\ H_N \end{bmatrix}$" and insert -- $H = \begin{bmatrix} H_1 \\ \vdots \\ H_i \\ \vdots \\ H_N \end{bmatrix}$ --.

In Column 19, Line 39-47, delete "$\begin{pmatrix} W_1 & & & & \\ & \circ & & & \\ & & W_i & & \\ & & & \circ & \\ & & & & W_N \end{pmatrix}$" and insert -- $W = \begin{pmatrix} W_1 & & & & \\ & \ddots & & & \\ & & W_i & & \\ & & & \ddots & \\ & & & & W_N \end{pmatrix}$ --.

In the Claims

In Claim 1, Column 28, Line 16-24, delete "$\begin{pmatrix} H_1 & & & & \\ & \circ & & & \\ & & H_i & & \\ & & & \circ & \\ & & & & H_N \end{pmatrix}$" and insert -- $\begin{pmatrix} H_1 & & & & \\ & \ddots & & & \\ & & H_i & & \\ & & & \ddots & \\ & & & & H_N \end{pmatrix}$ --.

CERTIFICATE OF CORRECTION (continued)
U.S. Pat. No. 10,879,968 B2

In Claim 1, Column 28, Line 28-36, delete "$\begin{pmatrix} W_1 & & & & \\ & \ddots & & & \\ & & W_i & & \\ & & & \ddots & \\ & & & & W_N \end{pmatrix}$" and insert --$\begin{pmatrix} W_1 & & & & \\ & \ddots & & & \\ & & W_i & & \\ & & & \ddots & \\ & & & & W_N \end{pmatrix}$--.

In Claim 1, Column 28, Line 42-50, delete "$\begin{pmatrix} H_1 & & & & \\ & \ddots & & & \\ & & H_i & & \\ & & & \ddots & \\ & & & & H_N \end{pmatrix} \times \begin{pmatrix} W_1 & & & & \\ & \ddots & & & \\ & & W_i & & \\ & & & \ddots & \\ & & & & W_N \end{pmatrix}$" and insert --$\begin{pmatrix} H_1 & & & & \\ & \ddots & & & \\ & & H_i & & \\ & & & \ddots & \\ & & & & H_N \end{pmatrix}_\times \begin{pmatrix} W_1 & & & & \\ & \ddots & & & \\ & & W_i & & \\ & & & \ddots & \\ & & & & W_N \end{pmatrix}$--.

In Claim 6, Column 29, Line 28-36, delete "$\begin{pmatrix} H_1 & & & & \\ & \ddots & & & \\ & & H_i & & \\ & & & \ddots & \\ & & & & H_N \end{pmatrix}$" and insert --$\begin{pmatrix} H_1 & & & & \\ & \ddots & & & \\ & & H_i & & \\ & & & \ddots & \\ & & & & H_N \end{pmatrix}$--.

CERTIFICATE OF CORRECTION (continued)
U.S. Pat. No. 10,879,968 B2

In Claim 6, Column 29, Line 41-49, delete "$\begin{pmatrix} W_1 & & & & O \\ & \ddots & & & \\ & & W_i & & \\ & & & \ddots & \\ O & & & & W_N \end{pmatrix}$" and insert -- $\begin{pmatrix} W_1 & & & & \\ & \ddots & & & \\ & & W_i & & \\ & & & \ddots & \\ & & & & W_N \end{pmatrix}$ --.

In Claim 6, Column 29, Line 55-63, delete "$\begin{pmatrix} H_1 & & & & O \\ & \ddots & & & \\ & & H_i & & \\ & & & \ddots & \\ O & & & & H_N \end{pmatrix} \times \begin{pmatrix} W_1 & & & & O \\ & \ddots & & & \\ & & W_i & & \\ & & & \ddots & \\ O & & & & W_N \end{pmatrix}$" and insert -- $\begin{pmatrix} H_1 & & & & \\ & \ddots & & & \\ & & H_i & & \\ & & & \ddots & \\ & & & & H_N \end{pmatrix}_\times \begin{pmatrix} W_1 & & & & \\ & \ddots & & & \\ & & W_i & & \\ & & & \ddots & \\ & & & & W_N \end{pmatrix}$ --.